US010051875B2

(12) United States Patent
Christopoulos et al.

(10) Patent No.: US 10,051,875 B2
(45) Date of Patent: Aug. 21, 2018

(54) BEVERAGE CONTAINER WITH RECESSED LID AND BREATHABLE SEAL

(71) Applicant: MIDEAS, LLC, Costa Mesa, CA (US)

(72) Inventors: James Christopoulos, Tustin, CA (US); Martin Todd Belle, Tustin, CA (US); David Huang, Torrance, CA (US); Fernando Pardo, Moorpark, CA (US); Adil Ali, Newbury Park, CA (US); Matthew Hern, Malibu, CA (US); Etienne Iliffe-Moon, Sherman Oaks, CA (US); Praveen Penmetsa, Torrance, CA (US); Matthew O'Brien, Hermosa Beach, CA (US); Steve Dafnis, Carlsbad, CA (US)

(73) Assignee: MIDEAS, LLC, Costa Mesa, CA (US)

( * ) Notice: Subject to any disclaimer, the term of this patent is extended or adjusted under 35 U.S.C. 154(b) by 250 days.

(21) Appl. No.: 14/843,858

(22) Filed: Sep. 2, 2015

(65) Prior Publication Data
US 2016/0058226 A1    Mar. 3, 2016

Related U.S. Application Data

(63) Continuation-in-part of application No. 14/272,327, filed on May 7, 2014, which is a continuation-in-part of application No. 13/669,363, filed on Nov. 5, 2012.
(Continued)

(51) Int. Cl.
*A23F 5/26* (2006.01)
*B65D 17/28* (2006.01)
(Continued)

(52) U.S. Cl.
CPC .......... *A23F 5/262* (2013.01); *B65D 17/163* (2013.01); *B65D 17/4011* (2018.01);
(Continued)

(58) Field of Classification Search
CPC ......... A23F 5/262; B65D 51/28; B65D 39/04; B65D 2517/0002
(Continued)

(56) References Cited

U.S. PATENT DOCUMENTS 933,302 A    9/1909 Hartwell
1,598,098 A    8/1926 Muhlbach
(Continued)

FOREIGN PATENT DOCUMENTS

CA    2582280    4/2009
CH    168306    3/1934
(Continued)

OTHER PUBLICATIONS

PCT/US2013/067715 International Search Report & Written Opinion dated Mar. 27, 2014.
(Continued)

*Primary Examiner* — James N Smalley
(74) *Attorney, Agent, or Firm* — Jeffer Mangels; Butler & Mitchell LLP; Brennan C. Swain, Esq.

(57) ABSTRACT

A beverage container that includes a main body portion having an open top, a closed bottom and an interior that defines a first volume, and a removable cover that includes a bottom and a generally cylindrical side wall extending upwardly from the bottom. The bottom and the generally cylindrical side wall cooperate to define a cover cavity, the removable cover is removably engaged with the main body portion, and the bottom includes a plug opening defined therethrough. A breathable plug is received in the plug opening. The plug allows a liquid disposed within the first volume to breathe with respect to an exterior of the beverage container.

12 Claims, 33 Drawing Sheets

Related U.S. Application Data

(60) Provisional application No. 62/045,486, filed on Sep. 3, 2014, provisional application No. 61/968,274, filed on Mar. 20, 2014, provisional application No. 61/916,049, filed on Dec. 13, 2013.

(51) Int. Cl.
*B65D 17/00* (2006.01)
*B65D 39/04* (2006.01)
*B65D 51/28* (2006.01)

(52) U.S. Cl.
CPC .............. *B65D 39/04* (2013.01); *B65D 51/28* (2013.01); *B65D 2517/0002* (2013.01)

(58) Field of Classification Search
USPC ............... 220/23.83, 371, 521, 523; 215/308
See application file for complete search history.

(56) References Cited

U.S. PATENT DOCUMENTS

| | | | |
|---|---|---|---|
| 1,687,887 A | 10/1928 | Pletcher | |
| 2,734,625 A | 2/1956 | Nelson | |
| 2,766,796 A | 10/1956 | Tupper | |
| 3,047,199 A | 7/1962 | McBain | |
| 3,229,478 A | 1/1966 | Alonso | |
| 3,502,206 A | 3/1970 | Hultberg | |
| 3,537,610 A | 11/1970 | Bilon | |
| 3,743,520 A | 7/1973 | Croner | |
| 3,779,372 A | 12/1973 | de Lloret | |
| 3,955,742 A | 5/1976 | Marshall et al. | |
| 3,985,069 A | 10/1976 | Cavalluzzi | |
| 4,091,953 A | 5/1978 | Daenen | |
| 4,271,973 A * | 6/1981 | Quagliaro | B65D 51/1616 215/261 |
| 4,277,000 A | 7/1981 | Jaarsma | |
| 4,372,921 A * | 2/1983 | Sanderson | A61L 2/28 206/524.8 |
| 4,386,696 A | 6/1983 | Goncalves | |
| 4,475,654 A | 10/1984 | Fruchter | |
| 4,636,328 A | 1/1987 | Flynn et al. | |
| 4,720,351 A | 1/1988 | Flynn et al. | |
| 4,784,678 A | 11/1988 | Rudick | |
| 5,207,341 A | 5/1993 | Yeager | |
| 5,318,183 A | 6/1994 | Cohen et al. | |
| 5,443,175 A | 8/1995 | Kelly | |
| 5,515,991 A | 5/1996 | Heitland | |
| 5,988,426 A | 11/1999 | Stern | |
| 6,085,927 A | 7/2000 | Kusz | |
| 6,202,880 B1 | 3/2001 | Strube | |
| 6,243,936 B1 | 6/2001 | Biesecker et al. | |
| 6,478,155 B2 | 11/2002 | Bunyan | |
| 7,934,624 B2 | 5/2011 | Seelhofer | |
| 7,946,452 B2 | 5/2011 | Hantman et al. | |
| 7,967,135 B2 | 6/2011 | Boatner | |
| 2002/0139709 A1 | 10/2002 | Bunyan | |
| 2004/0045969 A1 | 3/2004 | Chiang | |
| 2008/0017642 A1 | 1/2008 | King | |
| 2009/0022861 A1 | 1/2009 | Caunter et al. | |
| 2011/0056945 A1 | 3/2011 | Ramsey | |
| 2011/0271692 A1 | 11/2011 | Rasmussen et al. | |
| 2012/0269934 A1 | 10/2012 | Ramsey | |
| 2013/0320077 A1 | 12/2013 | Tran | |
| 2016/0031616 A1 * | 2/2016 | Rye | B65D 41/04 220/203.29 |

FOREIGN PATENT DOCUMENTS

| | | |
|---|---|---|
| CH | 283274 | 5/1952 |
| EP | 931729 | 7/1999 |
| JP | 2003081357 | 3/2003 |
| JP | 2004075087 | 3/2004 |
| WO | 2011124552 | 10/2011 |

OTHER PUBLICATIONS

PCT/US2014/069621 International Search Report & Written Opinion dated Mar. 17, 2015.
International Search Report and Written Opinion dated Dec. 7, 2015 in PCT/US2015/048188.
EP13850373 Search Report dated May 20, 2016.

* cited by examiner

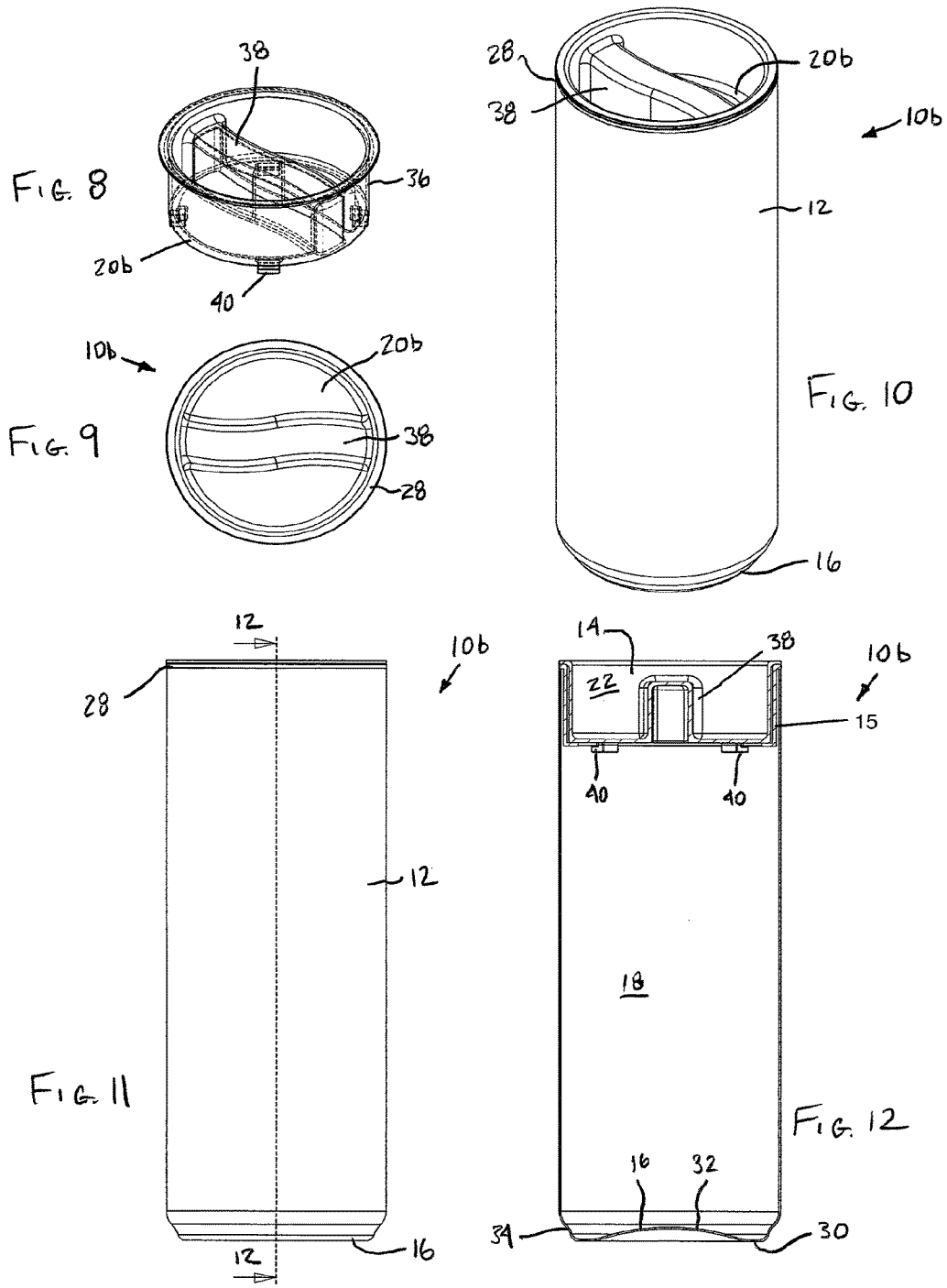

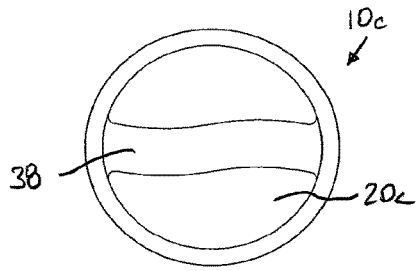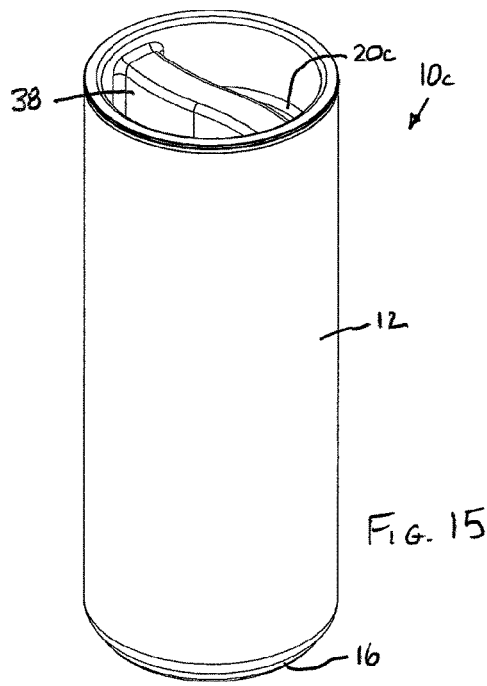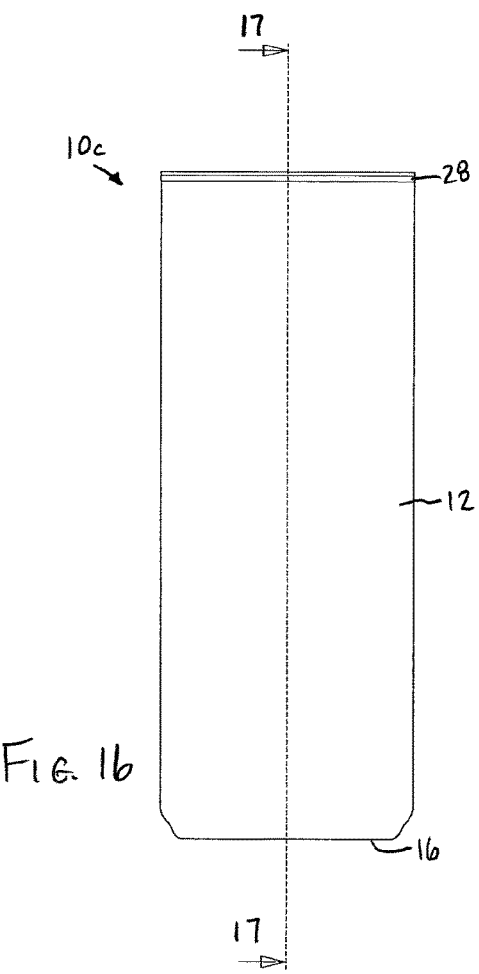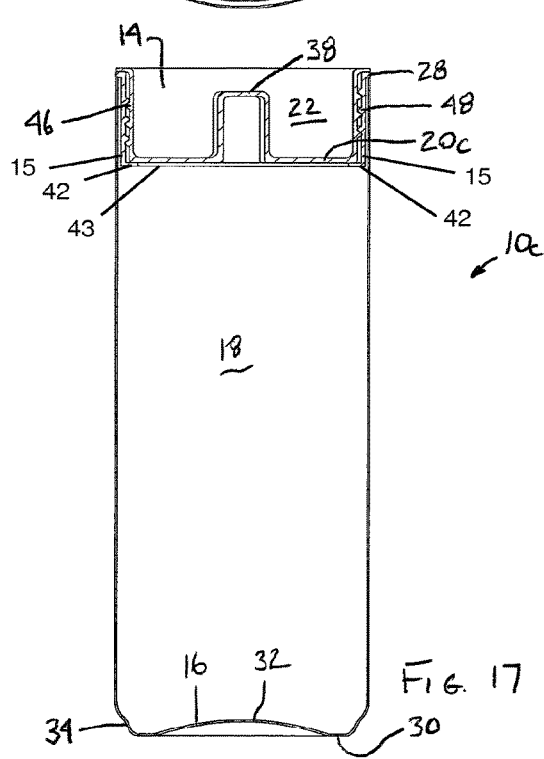

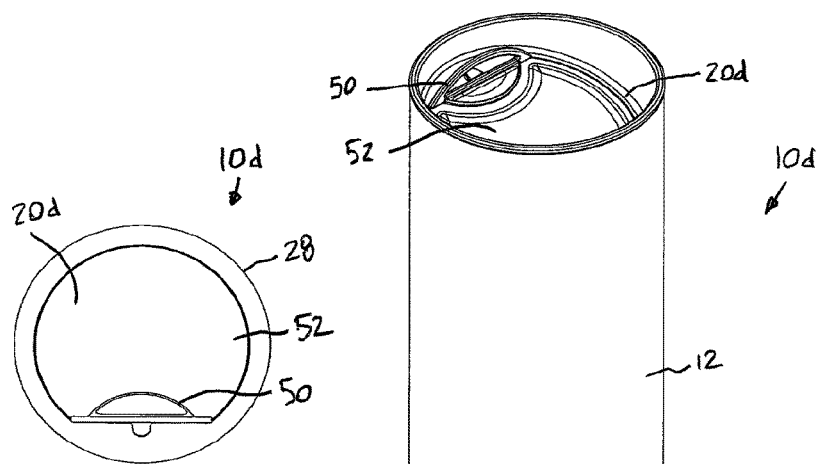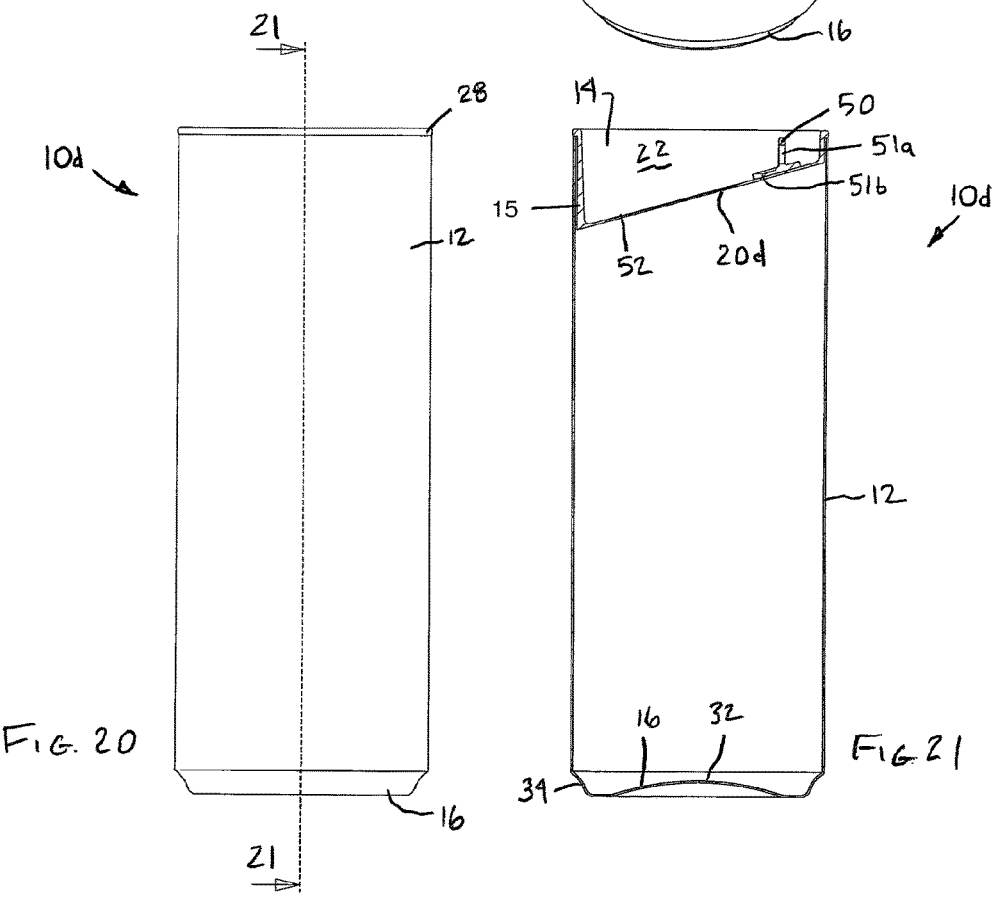

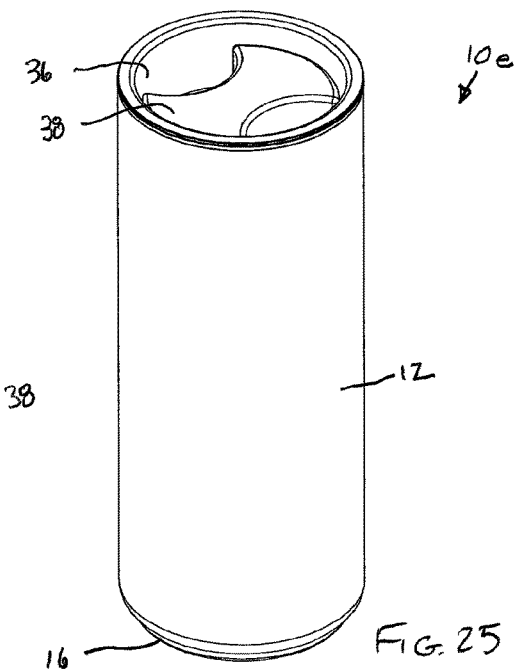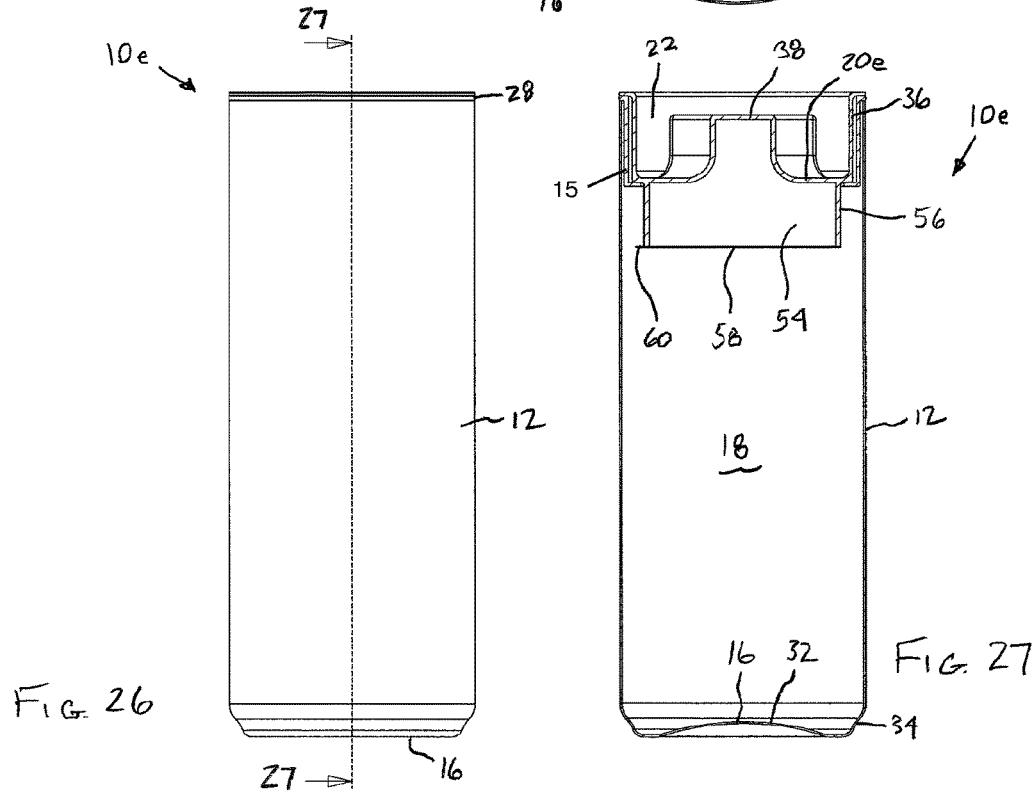

BEVERAGE CONTAINER WITH RECESSED LID AND BREATHABLE SEAL

CROSS-REFERENCE TO RELATED APPLICATIONS

This application is a continuation-in-part of U.S. patent application Ser. No. 14/272,327, filed May 7, 2014, which is a continuation-in-part of U.S. patent application Ser. No. 13/669,363, filed Nov. 5, 2012, now U.S. Pat. No. 8,939,311, and also claims the benefit of U.S. Provisional Application No. 61/968,274, filed Mar. 20, 2014, and U.S. Provisional Application No. 61/916,049, filed Dec. 13, 2013. This application also claims the benefit of U.S. Provisional Application No. 62/045,486, filed Sep. 3, 2014. All of the above applications are incorporated by reference herein in their entireties.

FIELD OF THE INVENTION

The present invention relates to a beverage container, and more particularly to a beverage container with a recessed top and the method for using the beverage container.

BACKGROUND OF THE INVENTION

To keep a beverage cool after opening a can, a user typically has to pour the contents into a cup or glass with ice therein or put an unfinished can into an ice chest or refrigerator where it risks being spilled. This can be an inconvenience for the user and promotes waste as it requires the use of materials for the can and for the cup or the use of soap and water to wash the non-disposable glassware.

SUMMARY OF THE PREFERRED EMBODIMENTS

In accordance with a first aspect of the present invention there is provided a beverage container that includes a main body portion having an open top, a closed bottom and an interior that defines a first volume, and a removable cover that includes a bottom and a generally cylindrical side wall extending upwardly from the bottom. The bottom and the generally cylindrical side wall cooperate to define a cover cavity, the removable cover is removably engaged with the main body portion, and the bottom includes a plug opening defined therethrough. A breathable plug is received in the plug opening. The plug allows a liquid disposed within the first volume to breathe with respect to an exterior of the beverage container or with respect to air that is trapped within the plug. In a preferred embodiment, the bottom includes a lip that at least partially defines the plug opening. The lip extends at least one of upwardly or downwardly from the bottom.

In accordance with another aspect of the present invention there is provided a beverage container that includes a main body portion having an open top, a closed bottom and an interior that defines a first volume, and a removable cover that includes a bottom and a generally cylindrical side wall extending upwardly from the bottom. The bottom and the generally cylindrical side wall cooperate to define a cover cavity. The removable cover is removably engaged with the main body portion and the bottom includes a filter portion therein. The removable cover further includes a removable lid that covers the cover cavity and partially defines the cover interior. A dry substance is disposed in the cover interior.

In accordance with another aspect of the present invention there is provided a method that includes providing a beverage container having a main body portion with an open top, a closed bottom and an interior that defines a first volume, and a removable cover removably engaged with the main body portion. The removable cover includes a bottom, a generally cylindrical side wall extending upwardly from the bottom and a removable lid. The bottom, the generally cylindrical side wall and the removable lid define a cover interior, and the bottom includes a filter portion. A dry substance is disposed in the cover interior. The method further includes removing the removable lid from the removable cover, pouring a liquid through the dry substance, through the filter portion and into the interior of the main body portion, and removing the removable cover from the main body portion to access the liquid.

In accordance with another aspect of the present invention there is provided a beverage container that includes a cylindrical main body portion having an open top and a closed bottom and that defines an interior. The bottom includes a contact surface and a continuous concave non-contact portion extending therebetween. The cylindrical main body portion defines a first volume. The container also includes a removable cover positioned at a location between the bottom and the top, and a recess defined between the removable cover and the open top. The recess defines a second volume that is between about 5% and about 50% of the first volume. In a preferred embodiment, the cylindrical main body portion includes a rim disposed adjacent the top, wherein the rim has a diameter that is greater than or equal to the diameter of the top of the cylindrical main body portion. Preferably, the non-contact portion does not include a convex portion. However, this is not a limitation on the present invention.

In a preferred embodiment, the cylindrical main body portion includes a ledge disposed on an inside surface thereof that has at least one notch defined therein. The removable cover includes at least one tab sized to fit through the notch. In a closed position, at least a portion of the tab extends under the ledge. The removable cover includes a cylindrical wall extending upwardly therefrom and a handle extending between opposing walls of the cylindrical wall. In another embodiment, the removable cover comprises a ring and fully removable lid. In another embodiment, the cylindrical main body portion includes threads on an inside surface thereof and the removable cover includes a cylindrical wall extending upwardly therefrom that has threads on an outside surface thereof that are matingly engaged with the threads on the cylindrical main body portion, and the cylindrical main body portion includes a ledge disposed on an inside surface thereof. The removable cover is in a sealing relationship with a top surface of the ledge. In another embodiment, the removable cover includes a tab and a stay on lid, and the tab includes a pull portion and a lever portion that engages the stay on lid. In a preferred embodiment, the removable cover is positioned at a location such that a standard volume of beverage can fill the first volume below the removable cover, and the second volume or recess is at least 20 mL.

In a preferred embodiment, the removable cover further includes a secondary container that includes a removable lid associated therewith. Preferably, the cylindrical main body portion includes a first beverage and the secondary container includes a second beverage, and the first and second beverages are separated by the removable lid.

In accordance with another aspect of the present invention there is provided a method that includes providing a beverage container that includes a cylindrical main body portion having an open top, a closed bottom and an interior that defines a first volume, a removable cover positioned at a location between the bottom and the open top, and a recess defined between the removable cover and the top of the cylindrical main body portion that defines a second volume. The beverage container includes a first beverage disposed therein that fills a third volume below the removable cover. The method also includes removing the removable cover, placing a second beverage into the interior such that the first and second beverages fill the third volume and at least a portion of the second volume.

In accordance with another aspect of the present invention there is provided a beverage container that includes a main body portion having an open top and a closed bottom, an interior, a circular rim and a first set of threads on an inside surface thereof that are positioned adjacent the rim at a first height. The rim includes a downwardly depending portion that extends below the first set of threads. The container also includes a removable cover with a bottom, a generally cylindrical side wall, an annular flange extending outwardly from the generally cylindrical side wall and an annular collar. The collar, the annular flange and the side wall define a first channel that receives the rim, and the bottom and the generally cylindrical side wall cooperate to define a cover cavity. The side wall includes a second set of threads on an outside surface thereof that are matingly engaged with the first set of threads.

In a preferred embodiment, the collar and the annular flange define a second channel opposed to the first channel, and the removable cover can be inverted from an original position where the rim is received in the first channel to an inverted position such that the rim is received in the second channel. Preferably, the collar is dimensioned such that when the removable cover is in the inverted position the collar provides a friction, pressure or interference fit on top of the main body portion. In another preferred embodiment, the generally cylindrical side wall includes a third set of threads that are matingly engaged with the first set of threads when the removable cover is in the inverted position.

In a preferred embodiment, the removable cover can be moved from an original position where the rim is received in the first channel to a bottom position where the bottom of the main body portion is received in the cover cavity, and wherein the generally cylindrical side wall is dimensioned to provide a friction, press or interference fit with the main body portion in the bottom position. In a preferred embodiment, the container includes a recess defined between the bottom of the removable cover and the open top of the main body portion. Preferably, the recess defines a second volume that is between about 5% and about 50% of the first volume.

In a preferred embodiment, the first set of threads are positioned at a first height, the downwardly depending portion of the rim includes a bottom edge that is positioned at a second height, and the first height is greater than the second height. Preferably, the removable cover is sealed with respect to the main body portion in both the original position and the inverted position. In a preferred embodiment, the removable cover includes a removable lid that covers the cover cavity and defines a cover interior, and an item is positioned in the cover interior.

In accordance with another aspect of the present invention there is provided a method that includes providing a beverage container having a main body portion with an open top, a closed bottom and defining an interior that defines a first volume. A beverage is disposed in the interior. The beverage container also includes a removable cover removably engaged with the main body portion in an original position. The removable cover includes a bottom and a generally cylindrical side wall extending upwardly from the bottom, and the bottom and the generally cylindrical side wall define a cover cavity. The method includes removing the removable cover from the cylindrical main body portion, and placing the removable cover on the cylindrical main body portion in an inverted position where the cover cavity is not positioned in the recess. In a preferred embodiment, the method further includes placing at least one additive in the interior before placing the cover on the main body portion in the inverted position, and shaking the beverage container after placing the cover on the main body portion in the inverted position.

In a preferred embodiment, the method includes the step of removing the removable cover from the main body portion when it is in either the original or inverted position, and placing the removable cover on the bottom of the main body portion such that the bottom of the main body portion is received in the cover cavity. In a preferred embodiment, the beverage container includes a recess defined between the bottom of the removable cover and the top of the main body portion. The recess defines a second volume, and when the removable cover is disposed in the original position the cover cavity is positioned within the recess, and when the removable cover is disposed in the inverted position the cover cavity is not positioned within the recess. Preferably, the second volume is between about 5% and about 50% of the first volume.

In a preferred embodiment, the step of removing the cover from the original position includes disengaging a second set of threads on the removable cover from the first set of threads. The step of placing the removable cover on the main body portion in an inverted position also preferably includes engaging a third set of threads on the removable cover with the first set of threads.

In a preferred embodiment, the method includes exposing a drinking opening in the bottom of the removable cover after removing the removable cover. This step can be done before or after placing the cover in the inverted position. It will be appreciated that the exposing of the drinking opening can be done, for example, by pulling, hinging or otherwise removing a tab off of the cover bottom. In an exemplary use, an empty beverage container can be provided with the cover in the original position. The cover can be removed, a beverage poured in and then the cover can be placed back on the main body portion in the inverted position and the drinking opening can then be exposed. Preferably, the bottom of the main body portion and the bottom of the removable cover have the same or similar amount of concavity so that beverage containers can be stacked on one another.

In accordance with another aspect of the present invention there is provided a method that includes providing a beverage container with a main body portion having an open top, a closed bottom and defines an interior that defines a first volume having a beverage disposed therein. The container also includes a removable cover removably engaged with the main body portion. The removable cover includes a bottom, a generally cylindrical side wall extending upwardly from the bottom and a removable lid. The bottom, the generally cylindrical side wall and the removable lid define a cover interior, and an item is positioned in the cover interior. The method includes removing the removable lid from the removable cover and removing the item from the cover interior, and removing the removable cover from the cylindrical main body portion.

In a preferred embodiment, the removable cover further includes a secondary container that includes the second beverage and has a removable lid, and the method includes removing the removable lid before placing the second beverage into the interior.

In an embodiment, the removable cover further includes a secondary container that includes a removable lid associated therewith. Preferably, the cylindrical main body portion includes a first beverage and the secondary container includes a second beverage, and the first and second beverages are separated by either the removable lid or the bottom of the removable cover.

It will be appreciated by those of ordinary skill in the art that the beverage containers herein provide the following features and advantages. The embodiments with a full aperture opening allow for improved can drinking experience through exposure to aroma, effervescence. The embodiments with a frusto-conical or tapered shape provide for stack-ability of the cans/containers. The ridges/bulge together with the taper provide a place for a user to hold the can, provide an improved grip and provide a more ergonomic feel. In certain embodiment, the smooth edge and lip contact area improves the can drinking experience through a cup like feel. As discussed below, the smooth edge or rim can be formed rolling the can material either inside or outside to provide a rim that is flat, squared or rounded. In a preferred embodiment, this provides a rim with no seam (between lid and can) or other encumbrances at lip contact area. In a preferred embodiment, there are no threads, tabs or sealing mechanisms at the lip contact area, because they are positioned below and/or inside the can/container.

In a preferred embodiment, the container opens with a twist and the lid/cover is threaded on to the top and inside of can with male (protruding) threads on the inside of the container and female threads on the exterior of the cover. Preferably, the threads (or other sealing mechanism) are not visible from the exterior of the container because the rim extends down far enough to cover, conceal or hide the threads. Preferably, the sealing structure is achieved by rolling exterior to interior or interior to exterior and not through rolling and seaming lid onto can.

As described more fully below, several sealing options are provided that include threads, tabs, barbs, o-rings, ridges, etc. In a preferred embodiment, the cover can be used as a secondary compartment to keep separate additives with a separate lid. In a preferred embodiment, the removable cover does not need to be disposed of or discarded, but can be affixed to bottom of can. Preferably, the lid can be inverted and affixed to top of can increasing the volume of the overall container. In the inverted position, the lid or cover attaches with an additional sealing method such as a tight/press fit or threads. Additional room provided by the inverted cover allows for additives, such as ice, mixers, further beverage, or the like. The inverted cover also allows the container to be used as a shaker.

In a preferred embodiment, to form the container, the cylindrical and/or frusto-conical main body portion is punched out of a piece of material (e.g., aluminum), the threads are formed therein, and then the top is rolled over to "hide" the threads from the outside to form the rim. Then, after the container is filled with a beverage, the cover (which is formed separately) is screwed on. The cover can be made of any desired material, e.g., metal, plastic, etc. As used herein "cylindrical" or "generally cylindrical" means that a component (e.g., the main body portion) has a circular cross-section, but does not necessarily have a constant diameter. For example, frusto-conical, tapered or the inclusion of a bulge is considered "cylindrical" or "generally cylindrical."

In a preferred embodiment, the removable cover fits on the bottom of the main body portion in a press or friction fit arrangement. Some states, territories or countries, etc. include laws or regulations that prevent cans with pull tabs that separate from the can (as they often become litter). With the removable cover capable of fitting on the bottom of the main body portion, a user can have a full aperture opening can and have a place to store the cover without throwing it away.

Beverage containers that include seals therein are described herein. However, some beverages, e.g., wine, must breathe while in the container. As is known, most wines bottles include corks, which provide breathability. In a preferred embodiment, the containers include seals or other mechanisms that provide breathability within the disclosed containers. For example, the seals discussed herein can be made of a breathable material, such as cork. Any closure seal between the lid and the container, whether through an axial (such as a cylindrical plug) and/or radial method (such as an annular gasket), is within the scope of the present invention. For example, the gasket or plug can be made of cork (natural or synthetic), foam or other type of permeable or non-permeable type membrane, such as fabric or the container or lid can include a pressure relief valve so that the container contents can develop, breathe, cook, release and/or expel gasses, pressures, or off flavors. For example, the container can be used to cook rice and the pressure given off thereby can be expelled through the pressure release valve.

An example is its use with aging and packaging wine in non-glass containers where the flavor attributes and profiles develop similar to that of wine aged in glass. Both axial and radial seals are intended to provide porosity characteristics similar to that of corks in glass bottles. When a plug is used to create the seal, the plug may be affixed or secured to the lid with friction, threads, bayonet tabs, or other methods.

In another embodiment, the container or lid can include a filter to allow for a liquid to be mixed with a dry substance (e.g., coffee grinds) and then filtered to result in a liquid without the dry substance therein (e.g., coffee). In a preferred embodiment, the lid includes a ground, milled, powdered, etc. dry food or beverage substance whereby the end product is a combination of two. By way of example, pre-ground coffee will be placed in the secondary container in the lid above water. The primary container will be removed and heated. The heated water will then be poured through the ground coffee creating a drinkable coffee. The same can work with tea or other dry substances.

The invention, together with additional features and advantages thereof, may be best understood by reference to the following description.

BRIEF DESCRIPTION OF THE DRAWINGS

FIG. 8 is a perspective view of the cover assembly from the beverage container of FIG. 7;

FIG. 9 is a top plan view of the beverage container of FIG. 7;

FIG. 10 is a top perspective view of the beverage container of FIG. 7;

FIG. 11 is a side elevational view of the beverage container of FIG. 7;

FIG. 12 is a cross sectional view of the beverage container of FIG. 7 taken along line 12-12 of FIG. 11;

FIG. 14 is a top plan view of the beverage container of FIG. 13;

FIG. 15 is a top perspective view of the beverage container of FIG. 13;

FIG. 16 is a side elevational view of the beverage container of FIG. 13;

FIG. 17 is a cross sectional view of the beverage container of FIG. 13 taken along line 17-17 of FIG. 16;

FIG. 18 is a top plan view of a beverage container in accordance with another preferred embodiment of the present invention;

FIG. 19 is a top perspective view of the beverage container of FIG. 18;

FIG. 20 is a side elevational view of the beverage container of FIG. 18;

FIG. 21 is a cross sectional view of the beverage container of FIG. 18 taken along line 21-21 of FIG. 20;

FIG. 24 is a top plan view of the beverage container of FIG. 23;

FIG. 25 is a top perspective view of the beverage container of FIG. 23;

FIG. 26 is a side elevational view of the beverage container of FIG. 23;

FIG. 27 is a cross sectional view of the beverage container of FIG. 23 taken along line 27-27 of FIG. 16;

Like numerals refer to like parts throughout the several views of the drawings.

DETAILED DESCRIPTION OF THE PREFERRED EMBODIMENTS

Figure 1:
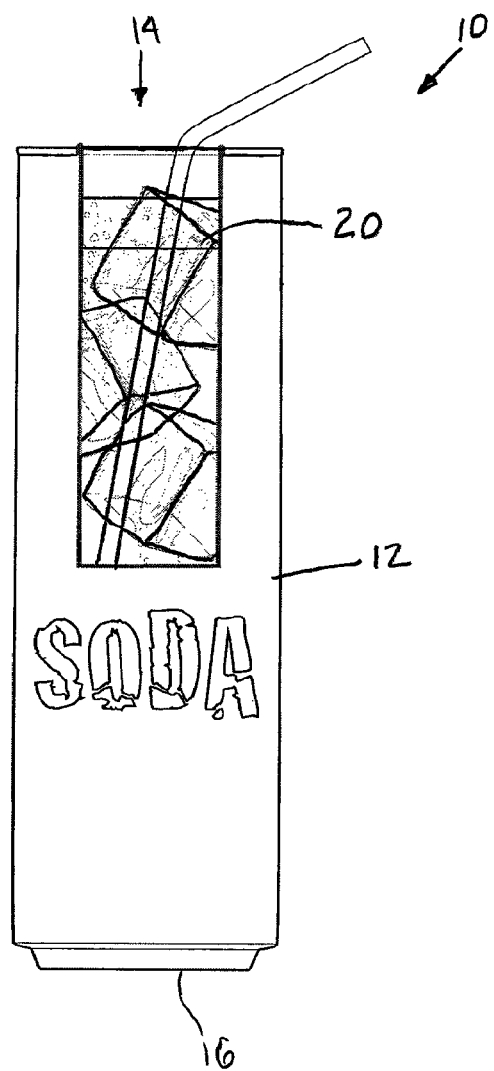
FIG. 1 is a side elevational view of a beverage container having a portion cut away to show liquid and ice therein in accordance with a preferred embodiment of the present invention.
Figure 2:
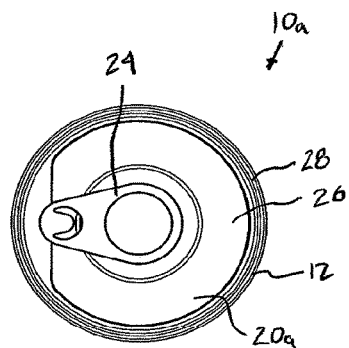
FIG. 2 is a top plan view of the beverage container of FIG. 1.
Figure 3:
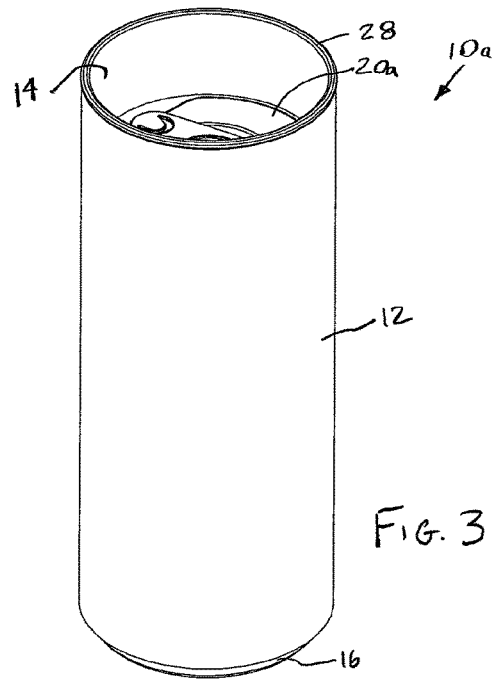
FIG. 3 is a top perspective view of the beverage container of FIG. 1.
Figure 4:
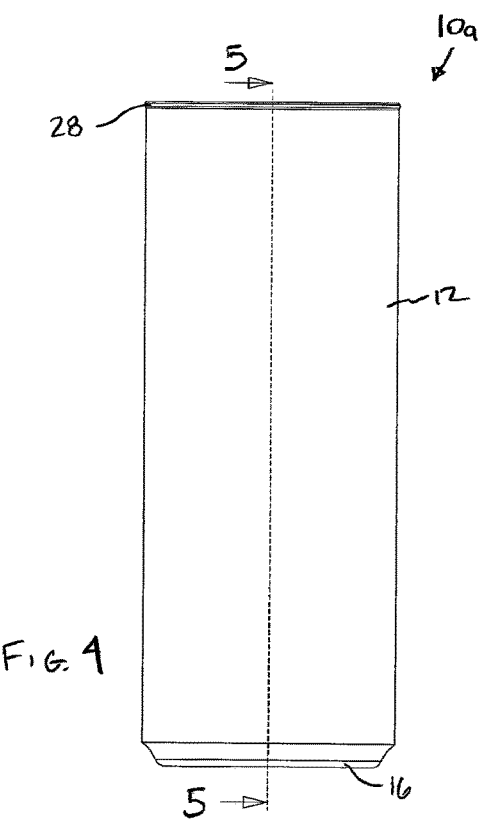
FIG. 4 is a side elevational view of the beverage container of FIG. 1.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-22 show several embodiments of beverage containers (generally referred to herein as 10 and individually referred to or designated as 10a, 10b, 10c, 10d, 10e, etc. in the figures) that each include a cylindrical main body portion 12 having an open top 14, a closed bottom 16, an interior 18, and a recessed removable cover 20 positioned at a location between the bottom 16 and the top 14. A recess 22 is defined between the removable cover 20 and the top of the cylindrical main body portion 12. Generally, in use, a standard volume of beverage fills the volume below the removable cover 20. A user can then remove the removable cover 20 and place other items or additives, such as alcohol, ice or other mixer into the container 10 without overflowing the container 10. For example, a standard volume for a can or beverage container is twelve fluid ounces. In an exemplary embodiment, the beverage container has a volume that can hold sixteen fluid ounces, but only includes twelve fluid ounces of cola therein. In use, a user removes the removable cover 20 and then pours three fluid ounces of whiskey therein to provide a whiskey and cola in the original cola container. In a preferred embodiment, the recess or extra space is between about 5% and about 50% of the total volume. In a more preferred embodiment, the recess or extra space is between about 10% and about 40% of the total volume. In the most preferred embodiment, the recess or extra space is between about 20% and about 30% of the total volume.

FIGS. 2-6 show a first embodiment of a beverage container 10a. As shown in FIGS. 2-6, container 10a includes a pull tab removable cover 20a or full-top pull-tab that includes a ring 24 connected to a fully removable lid 26, similar to the removable cover on a tennis ball can. Also see U.S. Pat. No. 3,349,949, the entirety of which is incorporated by reference herein.

Figure 5:
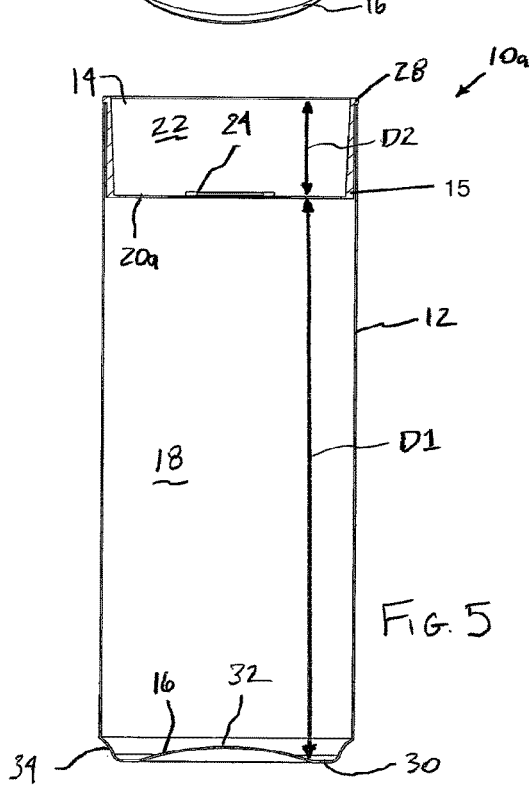
FIG. 5 is a cross sectional view of the beverage container of FIG. 1 taken along line 5-5 of FIG. 4.

As shown in FIG. 5, in a preferred embodiment, the container 10a includes a rim 28 that has an outer circumference that is the same or larger than the outer circumference of the cylindrical main body portion 12. It will be appreciated by those skilled in the art that the beverage container 10 with a rim 28 with an outer circumference about the same as the circumference of the cylindrical main body portion 12 (thereby providing relatively straight sides), and the recess 22 provides a more cup-like or glass-like feel when drinking from the beverage container 10. It will be appreciated that, as used herein, "removable cover" means that at least a portion of the removable cover can be removed or otherwise displaced so that the contents of the container 10 can be accessed. The container 10a can be manufactured such that the rim 28 and removable cover 20a are a unitary piece that at least partially define the recess 22. However, this is not a limitation on the present invention and the rim 28 and removable cover 20a can be separate components.

Figure 6:
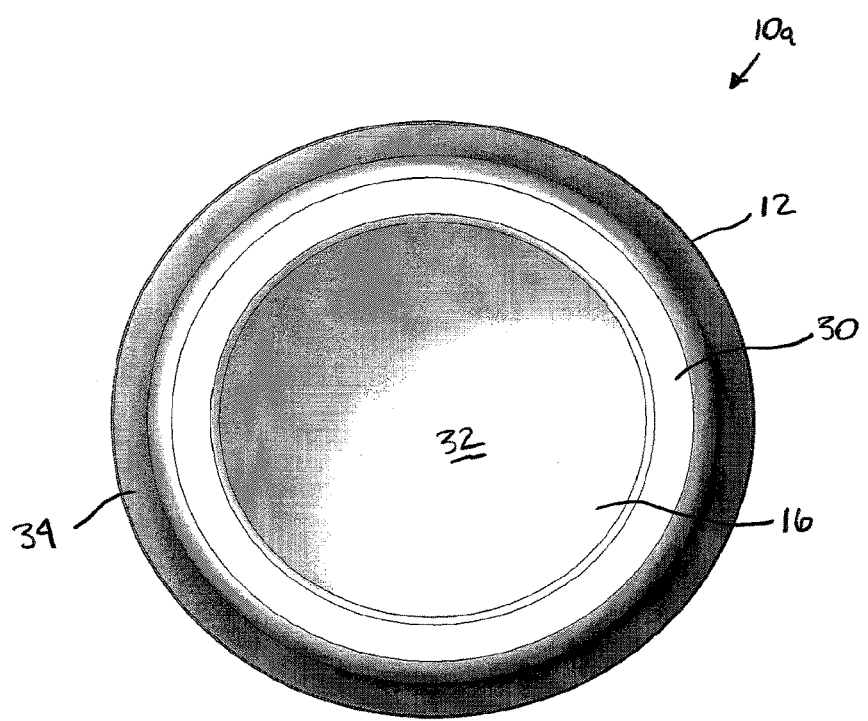
FIG. 6 is a bottom plan view of the beverage container of FIG. 1.

As shown in FIGS. 5-6, in a preferred embodiment, the bottom 16 includes a circular contact surface 30 that surrounds a non-contact portion 32 extending therebetween. In a preferred embodiment, the non-contact portion 32 has a continuous concave shape, as shown in FIG. 5. In another embodiment, the bottom 16 can include a rim and a flat bottom surface, similar to a can of beans or the like. The bottom 16 can also include a bevel 34, however, this is not a limitation on the present invention.

Figure 7:
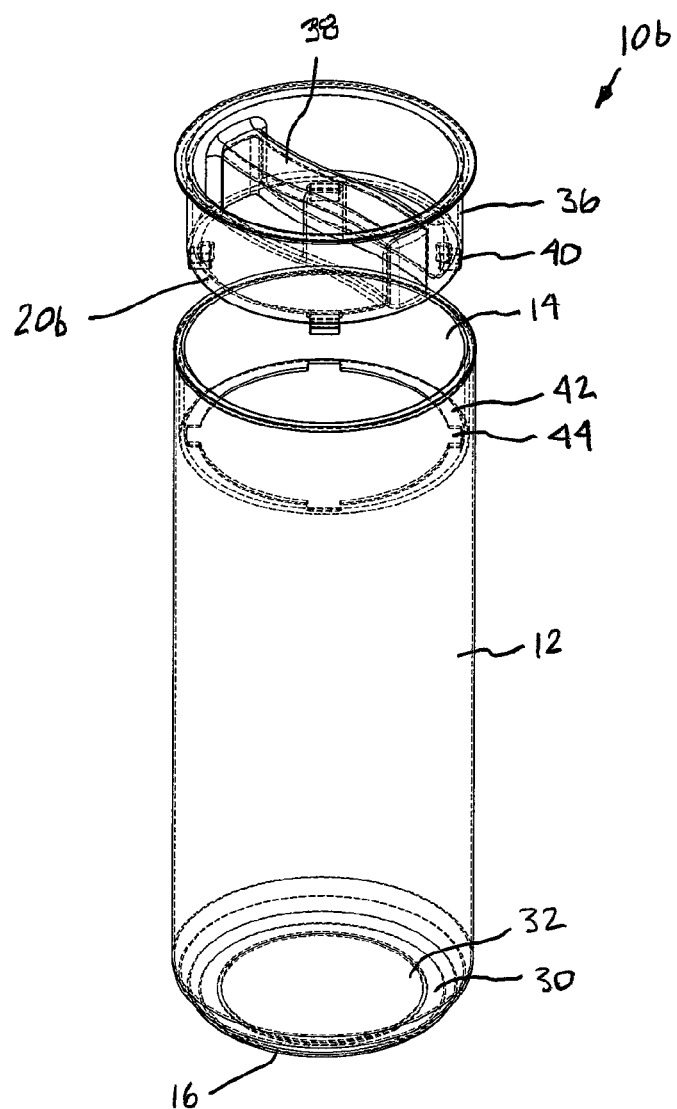
FIG. 7 is an exploded perspective view of a beverage container in accordance with another preferred embodiment of the present invention.

FIGS. 7-12 show a second embodiment of a beverage container 10b. As shown in FIGS. 7-8, the removable cover 20b includes a cylindrical side wall 36, a handle 38 and a plurality of tabs 40 that mate with a ledge 42 and corresponding notches 44 defined in the ledge 42. The ledge 42 is disposed on the interior surface of the cylindrical main body portion 12. Tabs 40 are received through notches 44 and then the removable cover 20b is rotated such that the tabs 40 are positioned under ledge 42, thereby securing the removable cover 20b on cylindrical main body portion 12, as shown in FIG. 12. In a preferred embodiment, a seal is positioned between removable cover 20b and ledge 42. It will be appreciated that this embodiment can be resealable.

Figure 13:
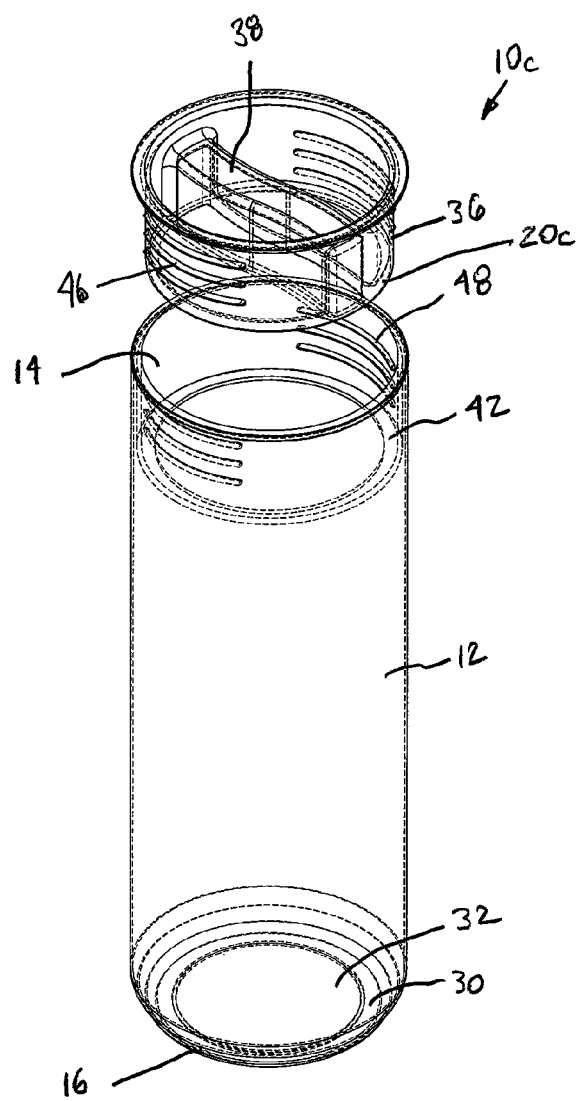
FIG. 13 is an exploded perspective view of a beverage container in accordance with another preferred embodiment of the present invention.
Figure 22:
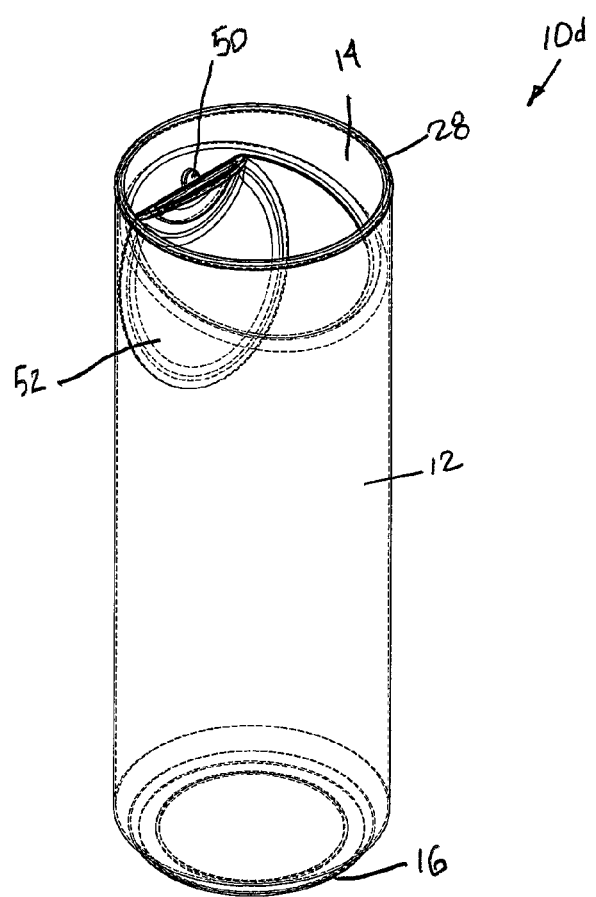
FIG. 22 is a top perspective view of the beverage container of FIG. 18 with the lid in the open position.
Figure 23:
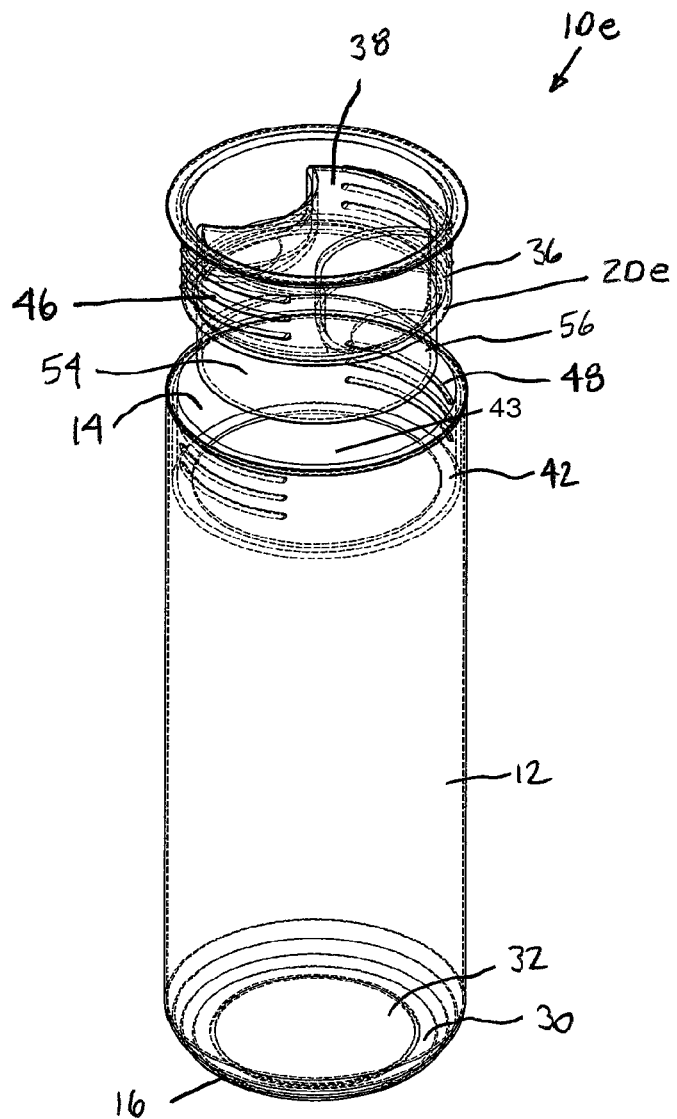
FIG. 23 is an exploded perspective view of a beverage container in accordance with another preferred embodiment of the present invention.
Figure 28:
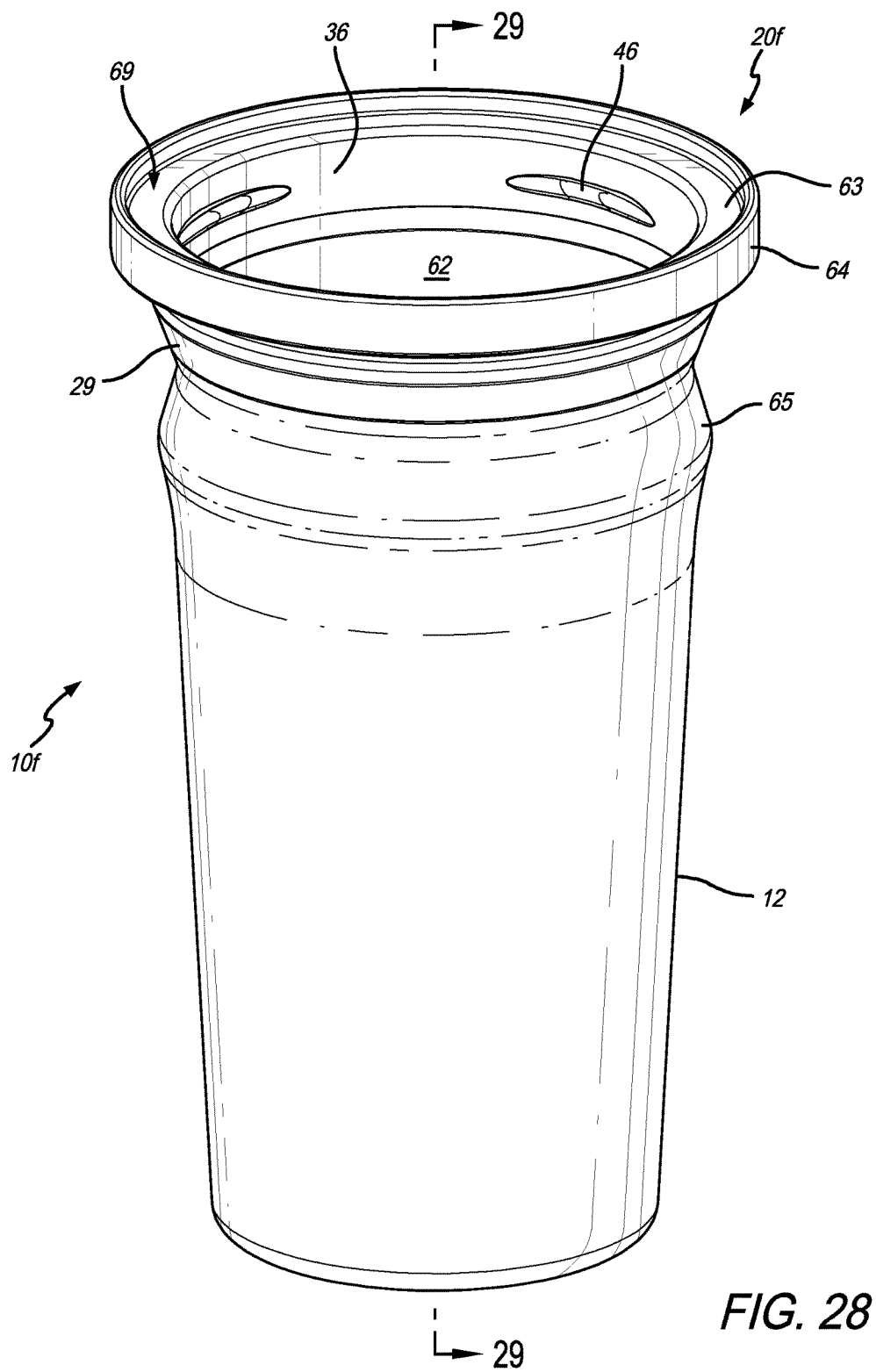
FIG. 28 is a perspective view of a beverage container with the lid threaded on the top of the can in accordance with a preferred embodiment of the present invention.

FIGS. 13-17 show a third embodiment of a beverage container 10c. As shown in FIG. 13, removable cover 20c includes threads 46 that mate with corresponding threads 48 on the interior surface of the cylindrical main body portion 12. In a preferred embodiment, beverage container 10c includes ledge 42 to provide a sealing surface with removable cover 20c. However, this is not a limitation and ledge 42 can be omitted. It will be appreciated that this embodiment can be resealable.

FIGS. 18-22 show a fourth embodiment of a beverage container 10d. As shown in FIG. 19, removable cover 20d of beverage container 10d includes a stay-on-tab that comprises a tab 50 that acts as a lever to depress a lid 52, which folds downwardly and into the container 10. The tab 50 includes a pull portion 51a and a lever portion 51b. As shown in FIG. 21, in a preferred embodiment, the removable cover 20d is slanted. However, this is not a limitation on the present invention and the removable cover 20d can be horizontally oriented.

FIGS. 23-27 show a fifth embodiment of a beverage container 10e. Beverage container 10e is similar to beverage container 10c, but includes a secondary container 54 associated therewith. The secondary container 54 is preferably used for holding another beverage. For example, if the cylindrical main body portion 12 includes soda therein, the secondary container 54, which is initially separated from the remainder of the interior 18 can hold an alcoholic beverage. Or, in the alternative, the main body portion 12 can include an alcoholic beverage and the secondary container 54 can include a mixer. In a preferred embodiment, the secondary container 54 includes a wall 56 that extends downwardly from the removable cover 20e and a removable lid 58. In a preferred embodiment, the lid 58 includes a tab 60 that can be grasped to pull the lid 58 off, similar to a yogurt container. It will be appreciated that other methods for removing the lid 58 are within the scope of the present invention. For example, the lid can be screwed on the secondary container 54.

In use, a user removes the removable cover 20e (via threads 46 and 48), removes lid 58 and pours the beverage in the secondary container 54 into the cylindrical main body portion 12 to form a mixed drink. In a preferred embodiment, beverage container 10e includes ledge 42 to provide a sealing surface with removable cover 20e. However, this is not a limitation and ledge 42 can be omitted. It will be appreciated that this embodiment can be resealable. Furthermore, the secondary container 54 can be incorporated into any of the other removable covers described herein or any other type of removable cover known in the art.

It will be appreciated by those skilled in the art that the beverage containers 10 disclosed herein can replace standard size beverage containers or cans such that the containers 10 contain a standard volume of fluid ounces or milliliters of a beverage, but the extra volume created by recess 22 provides for the ability to add or introduce ice or other liquid into the container 10. For example, as shown in FIG. 5, the removable cover 20 is positioned at a location such that 12 fl. Oz. fit into the container 10a below the cover 20 (see arrow D1) and 4 fl. Oz. can fit above the cover 20 (see arrow D2). After the removable cover 20 is removed, ice or other liquid can be added as desired in any amount up to 4 fl. Oz. without worry of overflow.

Throughout the world different size or volume cans or containers are used for serving beverages. For example, in North America, the standard can size is 12 fl. Oz. or 355 ml. 16, 24 and 40 fl. Oz. are also standard. In Canada, the standard size is 355 ml, which is approximately equivalent to twelve fluid ounces. In Australia the standard can size is 375 ml. In China, India South Africa and Europe, the most common standard size is 330 ml. In some European countries 500 ml and 440 ml size cans are used. In Japan the most common standard sizes are 350 ml and 500 ml. In Korea, 250 ml cans are the most common for soft drinks. However, when accompanying take out food, a short 245 ml can is standard. Furthermore, throughout the world, the standard size of a "shot" of alcohol is different. Typically a shot can be anywhere between 1 fl. Oz. and 3 fl. Oz or 20 and 100 mL. Lastly, standard ice tray receptacles hold between about 1 and 2 fl. Oz. However, ice cubes can be smaller or larger. In a preferred embodiment, the beverage container 10 can hold the standard volume of beverage and has space thereabove for at least one shot of alcohol, two ice cubes or both.

Exemplary uses will now be explained. At sports arenas, beer is often sold from a kiosk or stand where the server opens a can of beer, pours it into a cup and hands the cup to the patron. The can is usually not given to the patron to drink from because of the possibility of dirt or dust on the top of the can or to reduce liability from throwing the can. Therefore, this process requires materials for both the can and the cup. Further, the cup typically has the same general volume as the can. Therefore, the patron often spills some of the beer as he walks back to his seat (especially if he is carrying more than one cup). With the inventive container 10, the server can twist off or otherwise remove removable cover 20 and hand the container 10 to the patron. With the cover 20 gone, the patron essentially has a cup and with the extra space created by recess 22, spillage is less likely. If desired, the server can give the cover 20 to the patron so the container 10 can be resealed. Furthermore, the bevel 34 makes the containers 10 stackable, which further decreases spillage after the container 10 has been opened.

In another embodiment, the container can be filled with wine. Wine is more enjoyable when the top opening of the drinking container (e.g., wine glass) is large enough for a user's nose to fit therein. With traditional cans, this is not possible because of the small opening. Furthermore, wine drinkers often swirl the wine within the container to release the aroma. With the present invention, because the entire cover is removed and there is space created by recess 22, a user can both swirl the contents without worry of spillage and can fit his/her nose in the open top of the container.

It will be appreciated that modifications can be made to the embodiments described herein without deviating from the scope of the present invention. For example, the main body portion of the container can be a shape other than cylindrical or round, such as ovular, square, rectangular or the like, the removable cover can be secured in place in other manners, such as snap or press fit.

With reference to FIGS. 28-36, another preferred embodiment of a beverage container 10f with a removable and recessed cover 20f. FIGS. 28-31 show the container 10f and cover 20f in a first or original position (i.e., the position when a user purchases the container). As shown, the container 10f includes a generally frusto-conical main body portion 12 having an open top 14, a closed bottom 16, an interior 18, and the recessed removable cover 20f. In a preferred embodiment, the bottom 16 includes a circular contact surface 30 that surrounds a non-contact portion 32 extending therebetween. In a preferred embodiment, the non-contact portion 32 has a continuous concave shape.

The cover 20f includes a bottom 21, a side wall 36 extending upwardly from the bottom 21, an annular flange 63 and a collar 64. The bottom 21 and side wall 36 cooperate to define a cover cavity 62. The cover cavity 62 generally is the volume below the annular flange 63 when the removable cover is in the original position (see FIG. 29).

Generally, in use, a standard volume of beverage fills the volume below the removable cover 20. A user can then remove the removable cover 20f and place other items or additives, such as alcohol, ice or other mixer into the container 10 without overflowing the container 10 (due to recess 22). In an exemplary embodiment, the beverage can take up about 80% of the volume of the container 10, thus leaving about 20% for ice or other liquid, etc. after the removable cover 20 is removed.

Figure 29:
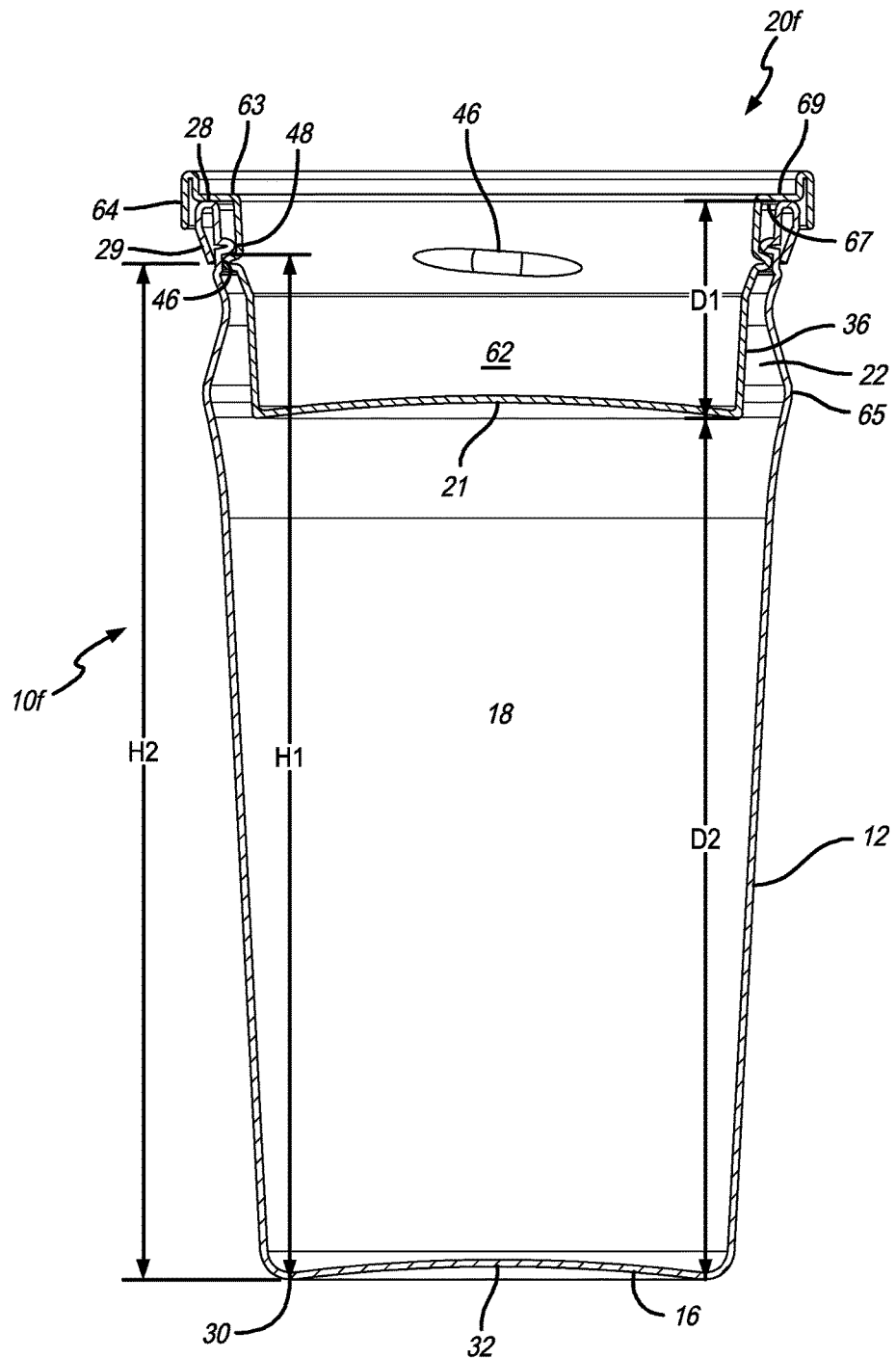
FIG. 29 is a cross-section taken along line 29-29 of FIG. 28.
Figure 30:
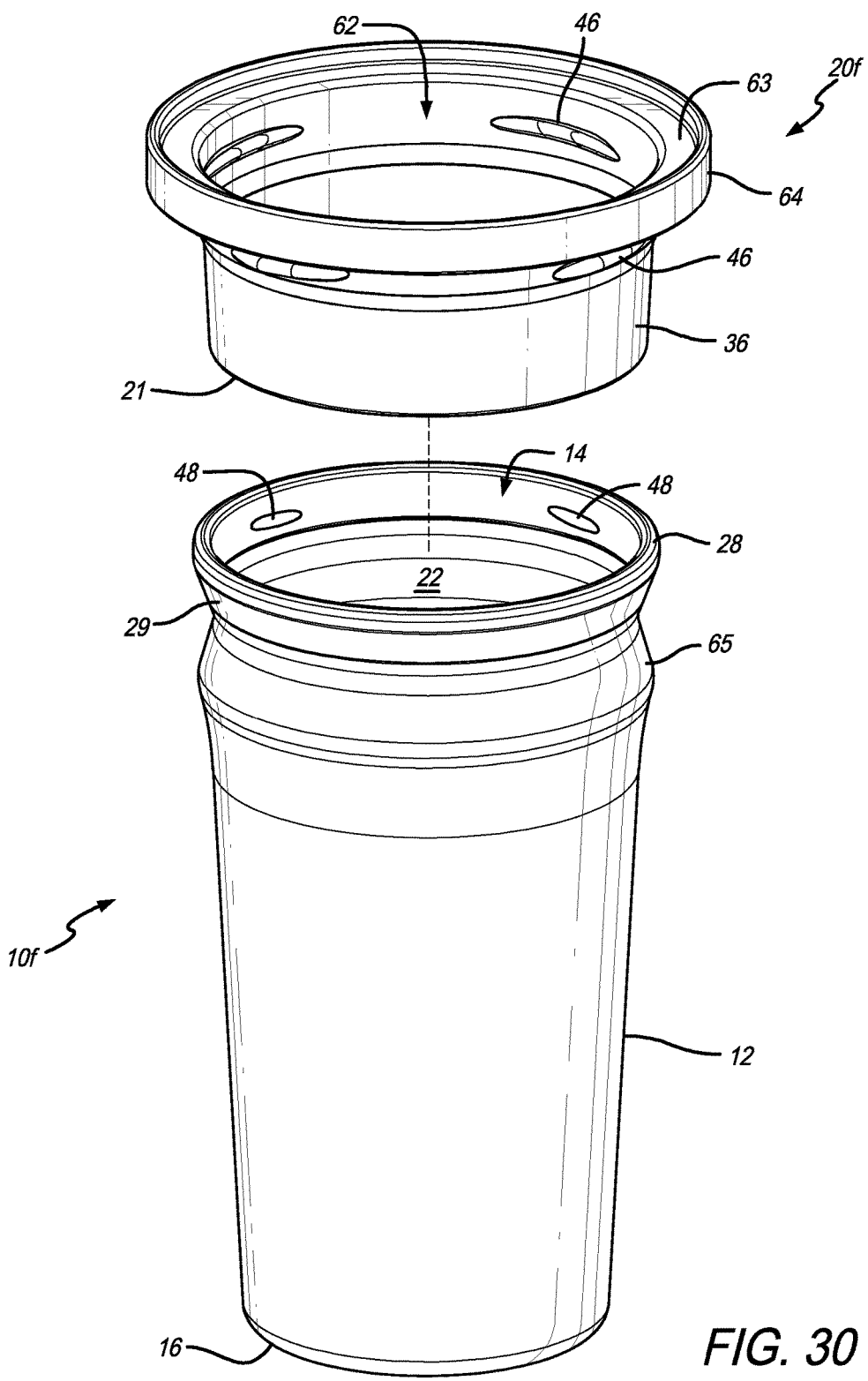
FIG. 30 is an exploded perspective of the beverage container and cover of FIG. 28.

As is best shown in FIG. 29, in a preferred embodiment, the container 10f includes a bulge section 65 that provides a place for a user to hold the container 10f and a rim 28 that is formed by the material forming the main body portion 12 (e.g., aluminum) being rolled or bent to the outside thereof. The removable cover 20f includes threads 46 that mate with corresponding threads 48 on the interior surface of the main body portion 12. In a preferred embodiment, the threads 48 are short interrupted threads to reduce turbulence while drinking. However, this is not a limitation and the threads 48 can be longer or continuous. As shown in FIG. 29, in a preferred embodiment, the rim 28 includes a downwardly depending portion 29 that extends downwardly enough on the outside of the main body portion 12 to hide, cover or conceal the threads 48. In other words, the threads 48 are positioned at a first height H1 and the bottom edge of the downwardly depending portion 29 of the rim is positioned at a second height H2, and the first height H1 is greater than the second height H2. In the first position, the collar 64 extends over and outside of the rim 28. In use, the beverage container 10 may include a tamper evident seal around the collar 64 and the portion of the main body portion 12 adjacent thereto.

The collar 64 together with the annular flange 63 and the side wall 36 define first and second channels 65 and 67 that receive the rim 28 when it is positioned on the main body portion 12 in the first and second positions, respectively.

Figure 31:
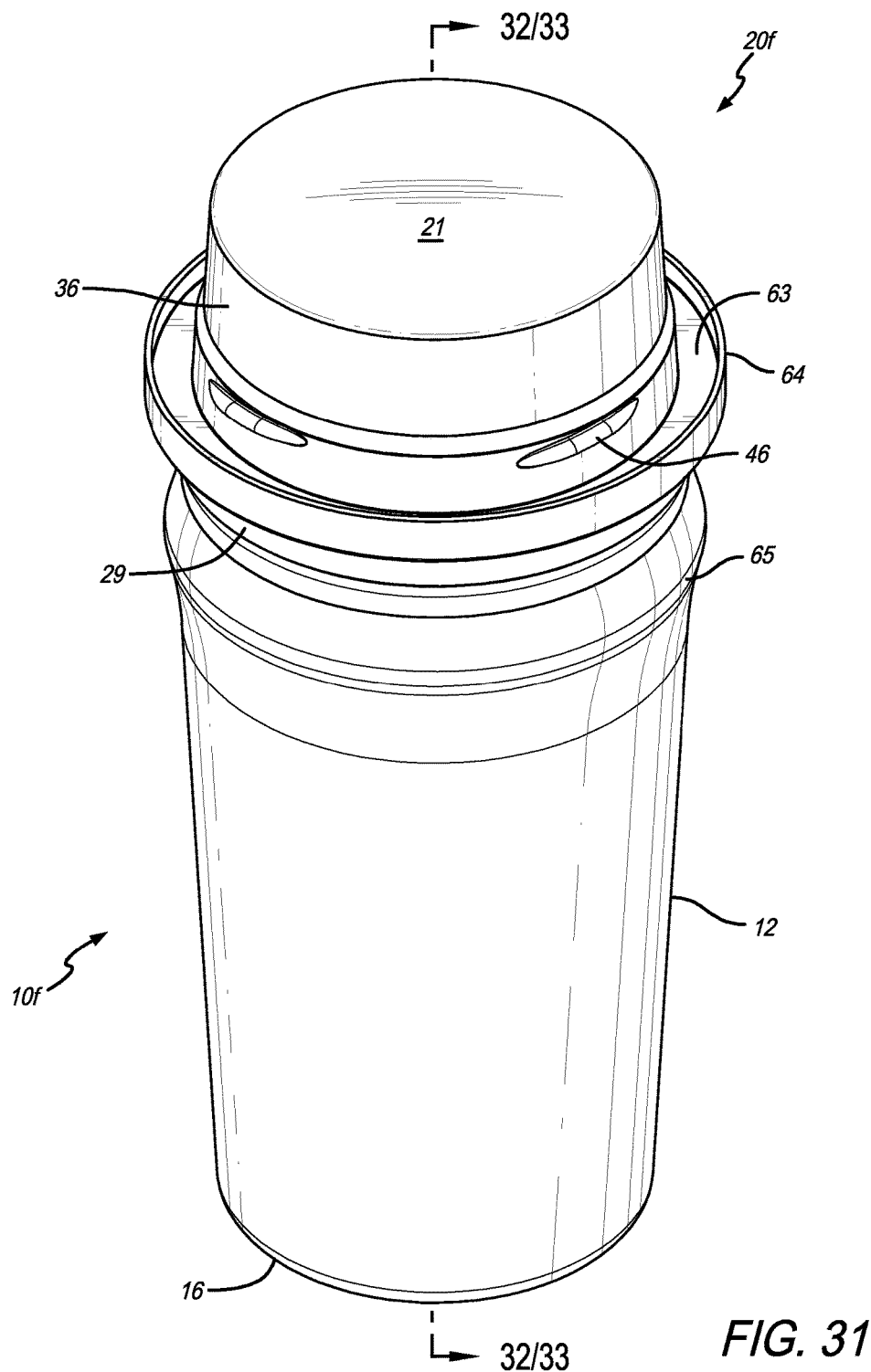
FIG. 31 is a perspective view of the beverage container of FIG. 28 with the cover inverted.
Figure 32:
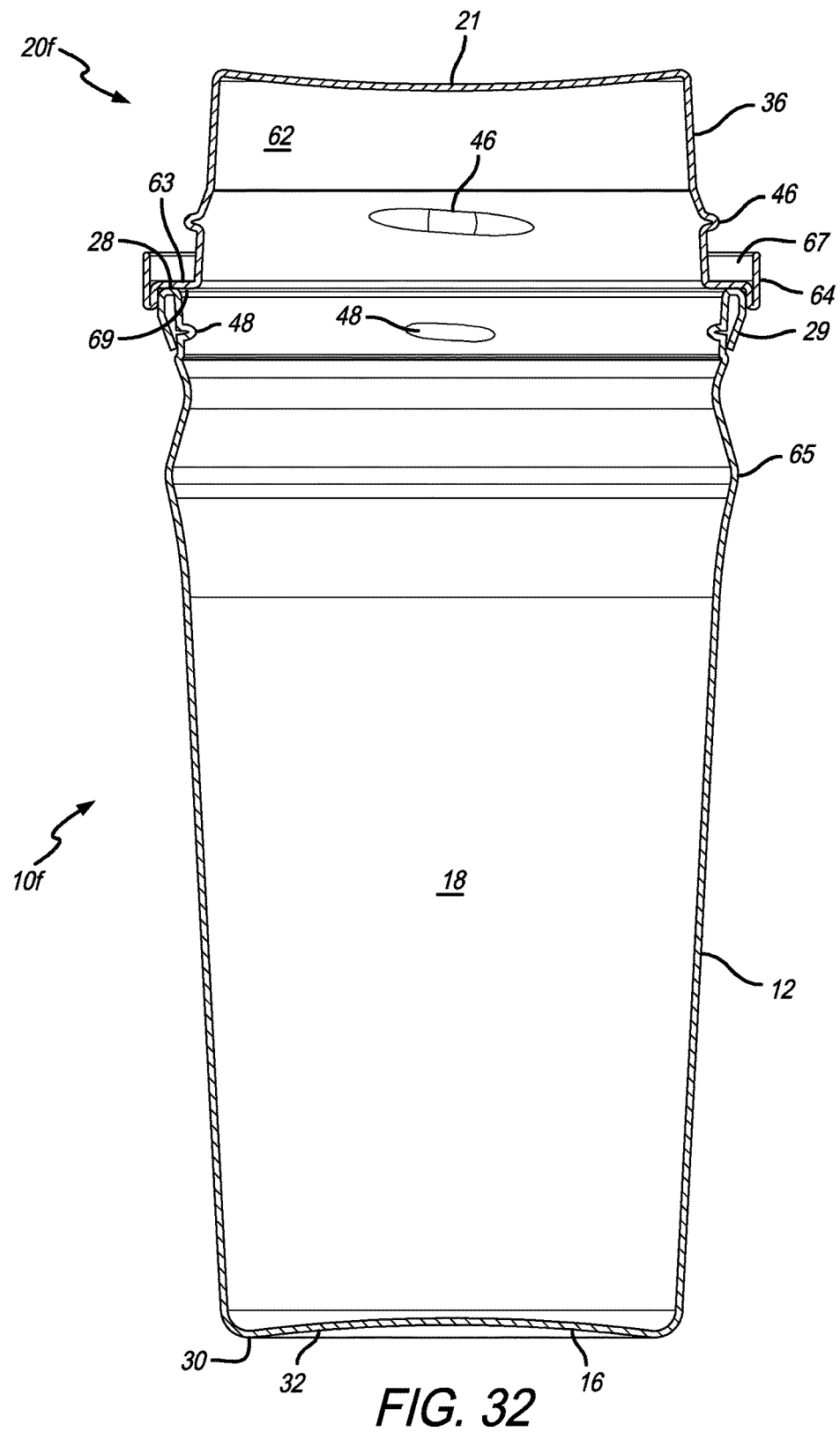
FIG. 32 is a cross-section taken along line 32/33-32/33 of FIG. 31 and showing a pressure fit of the inverted cover on the beverage container.
Figure 33:
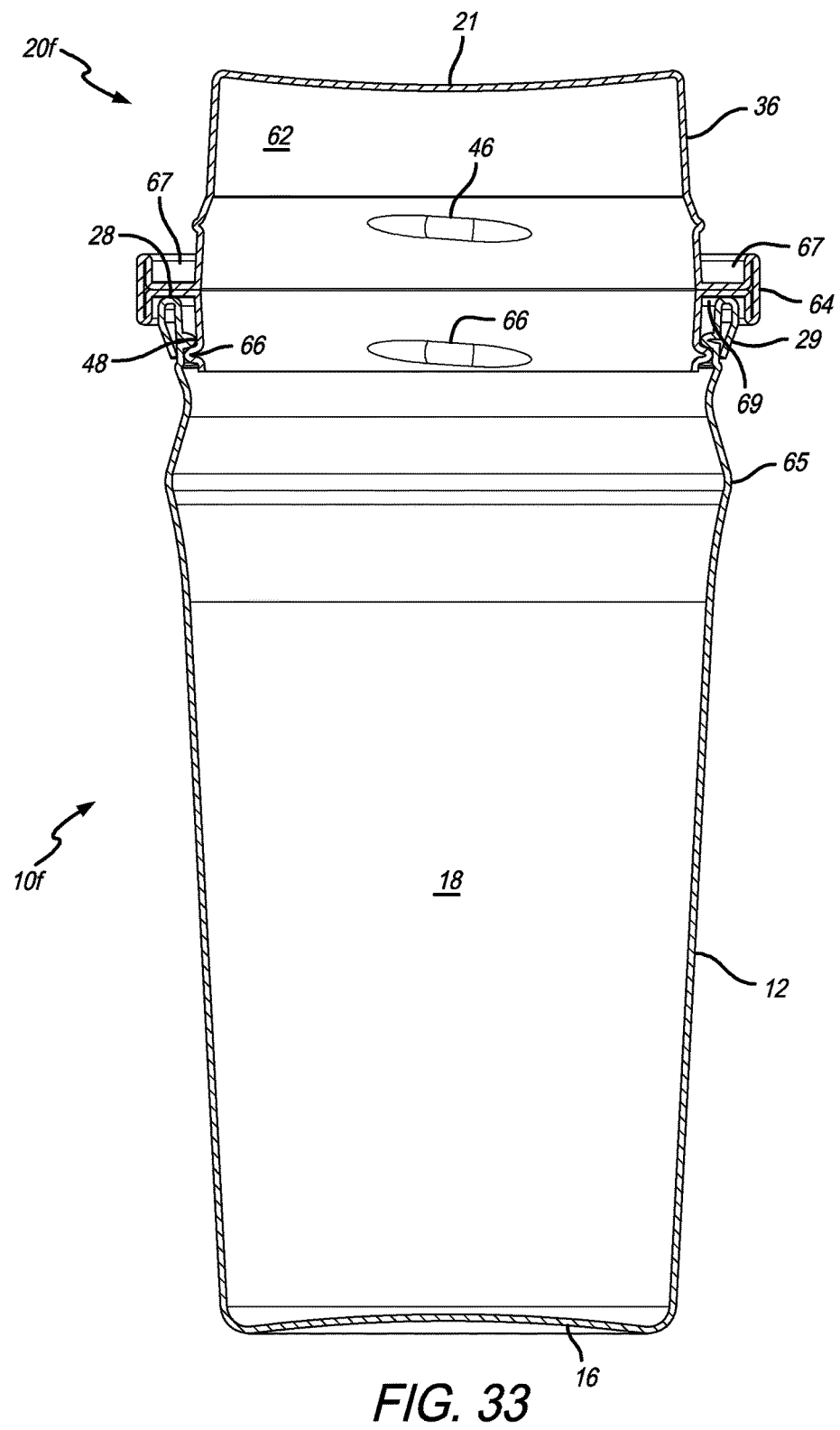
FIG. 33 is a cross-section of another embodiment taken along line 32/33-32/33 of FIG. 31 and showing a threaded fit of the inverted cover on the beverage container.

FIGS. 31-33 show the removable cover 20f in a second or inverted position. This position is typically utilized after the initial removal of the removable cover 20f. For example, if ice or other liquid has been added to the contents of the container 10, the level of liquid may be too high to put the removable cover 20f back on in the first position. Therefore, the removable cover 20f is inverted and placed on the top of the main body portion 12. This can be done to allow the contents to be shaken or to prevent spillage. Two different ways of inverting the removable cover 20f and connecting it to the top of the cylindrical main body portion 12 are shown in the drawings. The first embodiment (see FIG. 32) is essentially a press, friction or tight fit on the top of the cylindrical main body portion 12, where the collar 64 squeezes against the rim 28. In the second embodiment, (see FIG. 33), once the removable cover 20f is inverted, a second set of threads 66 are provided that mate with threads 48 on the main body portion 12. In other embodiments, the removable cover 20f can be secured to the top of the main body portion 12 by other methods, e.g., snap fit, pliable protrusions, etc.

Figure 34:
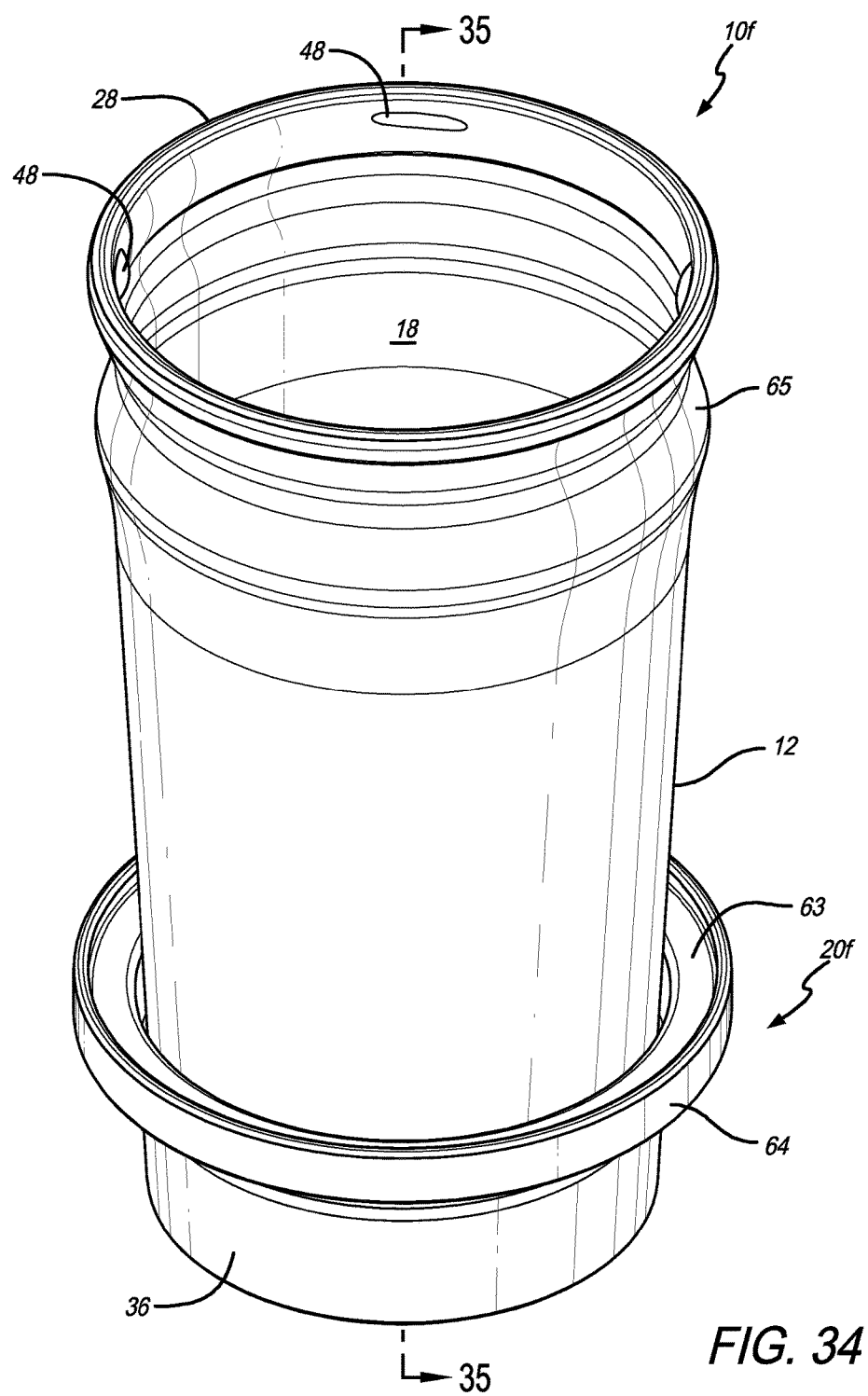
FIG. 34 is a perspective view of the beverage container of FIG. 28 with the cover on the bottom thereof.
Figure 35:
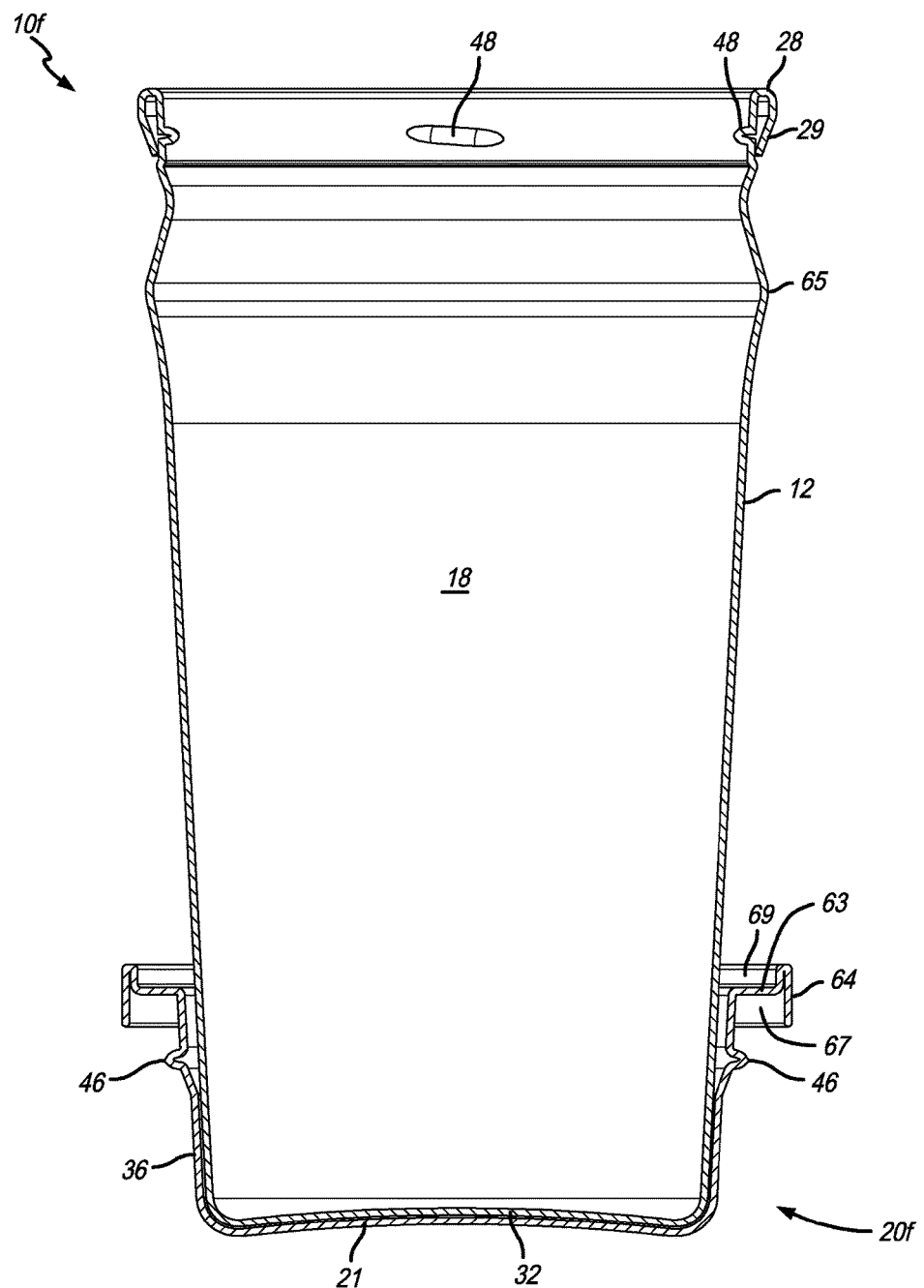
FIG. 35 is a cross-section taken along line 35-35 of FIG. 34.

FIGS. 34-35 show the removable cover 20f on the bottom of the cylindrical main body portion 12 (a third or bottom position). In a preferred embodiment, the removable cover 20f is held on the bottom of the main body portion 12 by a press or friction fit. In another embodiment, the removable cover 20f can be secured to the bottom of the main body portion 12 by a threaded or snap fit or any other type of fit. With this configuration, the removable cover 20f can be disposed of with the main body portion 12 and not discarded separately. In a preferred embodiment, to provide stability, the concavity of the bottom 21 of the lid matches the concavity of the bottom of the cylindrical main body portion 12.

Figure 36:
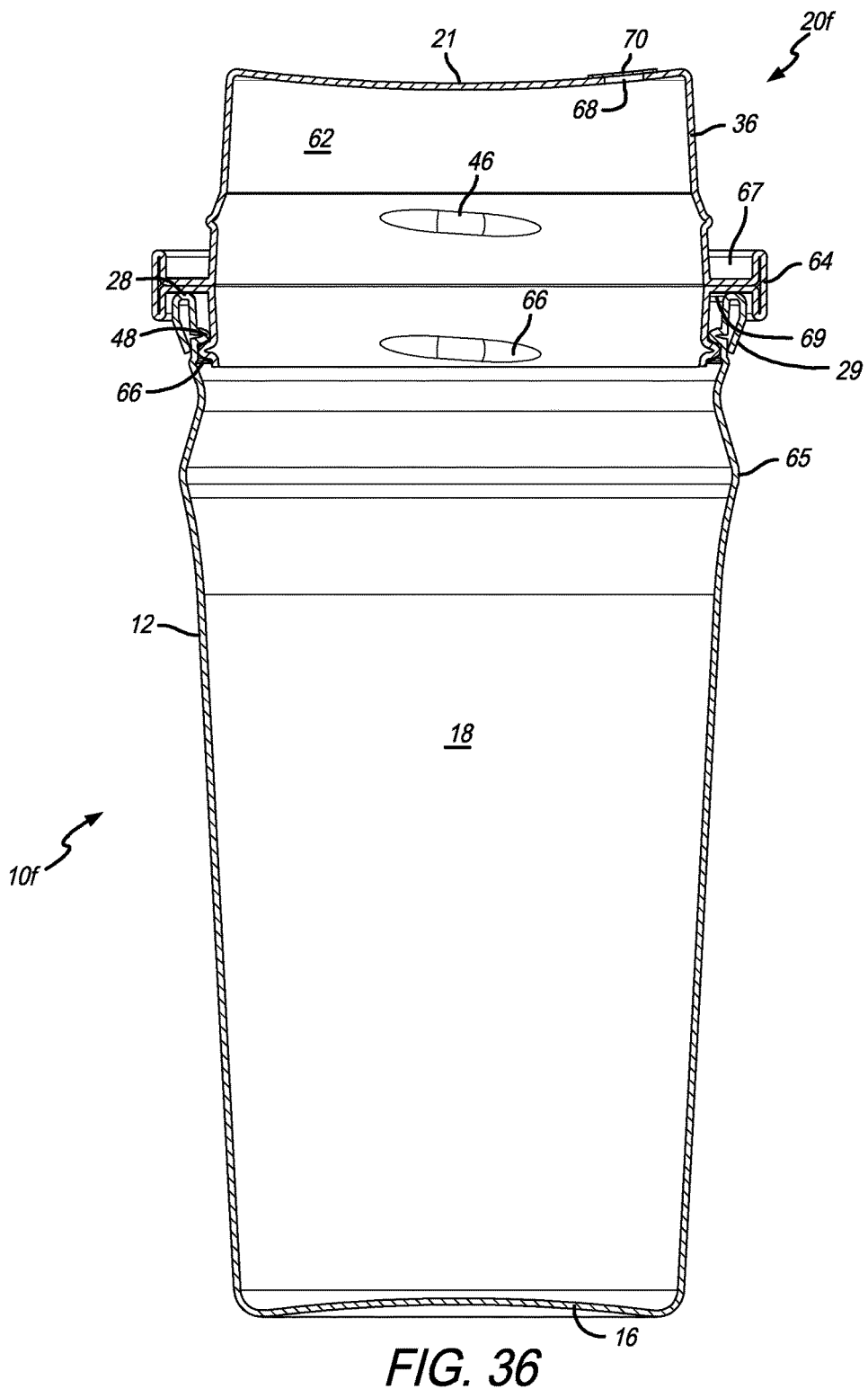
FIG. 36 is a cross-section similar to FIG. 33, but with an opening for drinking in the cover.

FIG. 36 shows an embodiment similar to the one shown in FIG. 33, but where the removable cover 20f includes a drinking opening 68 with a removable, pivotable or hingable tab 70. Therefore, once the removable cover 20f is inverted, and the tab 70 is removed or otherwise moved from the drinking opening 68, a user can drink through the exposed drinking opening 68.

Figure 37A:
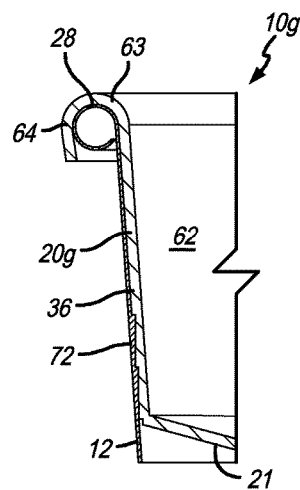
FIG. 37A is a cross-sectional cut away showing a beverage container with a cover having a barb seal in accordance with a preferred embodiment of the present invention.
Figure 37B:
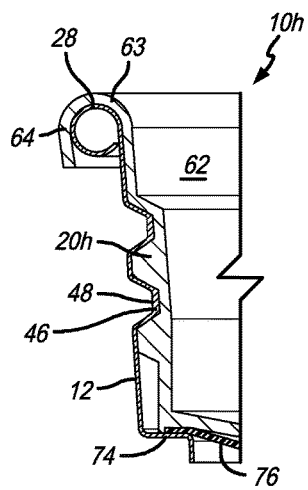
FIG. 37B is a cross-sectional cut away showing a beverage container with a threaded cover and a disc seal in accordance with a preferred embodiment of the present invention.
Figure 37C:
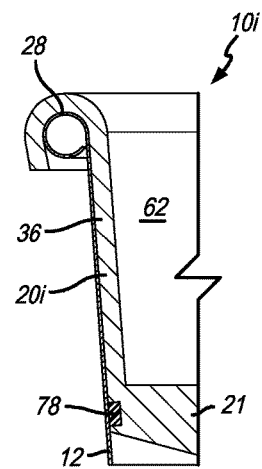
FIG. 37C is a cross-sectional cut away showing a beverage container with a cover having an o-ring seal in accordance with a preferred embodiment of the present invention.
Figure 37D:
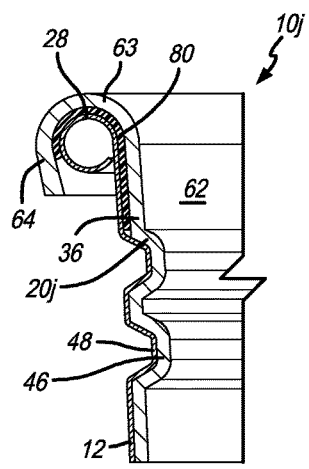
FIG. 37D is a cross-sectional cut away showing a beverage container with a threaded cover and a lip seal in accordance with a preferred embodiment of the present invention.
Figure 37E:
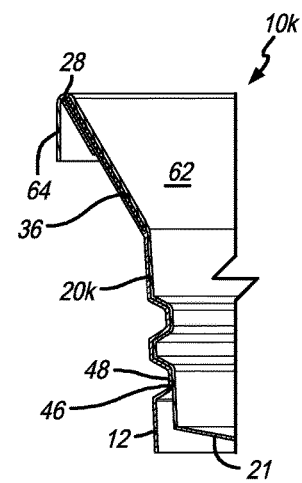
FIG. 37E is a cross-sectional cut away showing a beverage container having a flared top and a threaded cover in accordance with a preferred embodiment of the present invention.
Figure 37F:
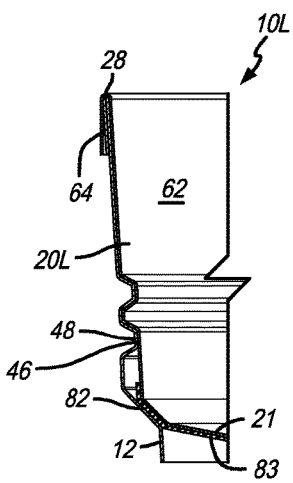
FIG. 37F is a cross-sectional cut away showing a threaded cover with a lower seal in accordance with a preferred embodiment of the present invention.

FIGS. 37A-37F show different exemplary embodiments beverage containers 10 with removable recessed covers 20. FIG. 37A shows a beverage container 10g having a removable cover 20g that seals to the main body portion 12 via a barb seal 72 that provides a seal with downward pressure from the removable cover 20g. The barb seal 72 also provides a compliant sealing surface, which can be advantageous if there are any irregularities in the main body portion 12. Multiple barb seals can be provided for redundancy. FIG. 37B shows a beverage container 10h having a threaded removable cover 20h that abuts a shoulder 74 in the main body portion 12 that includes a disc seal 76. FIG. 37C shows a beverage container 10i having a removable cover 20i that seals to the main body portion 12 via an o-ring seal 78. FIG. 37D shows a beverage container 10j having a threaded removable cover 20j that includes a seal 80 that extends around the rim 28 that abuts a shoulder 74 in the main body portion 12. FIG. 37E shows a beverage container 10k having a removable cover 20k and associated main body portion 12 that include a rim 28 that flares outwardly. A seal 81 is provided between the rim 28 and the removable cover 20k. FIG. 37F shows a beverage container 10L having a threaded removable cover 20L that abuts a bevel 82 in the main body portion 12 that includes a seal 83.

Figure 38:
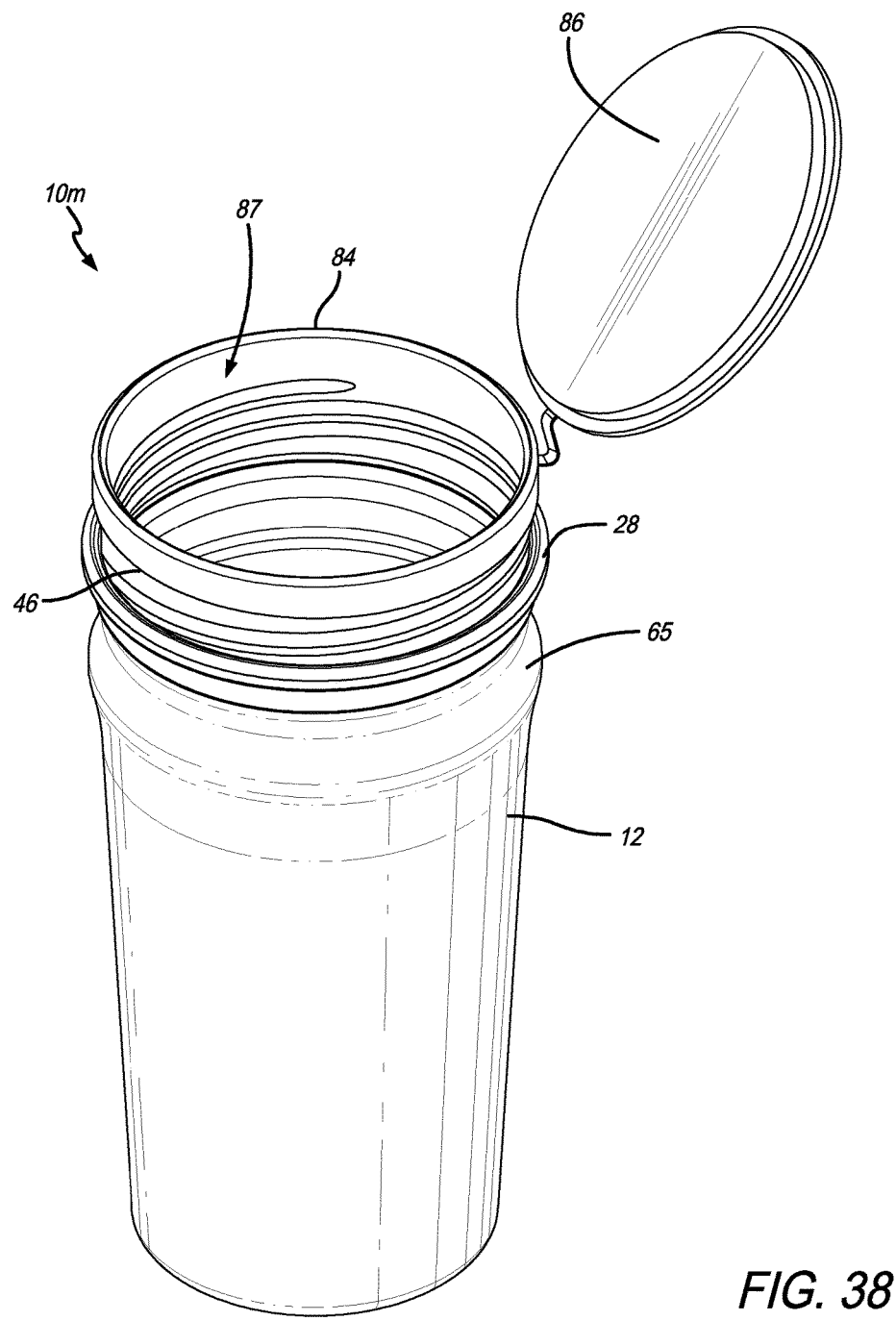
FIG. 38 is a perspective view of an expanding beverage container in accordance with a preferred embodiment of the present invention.
Figure 39:
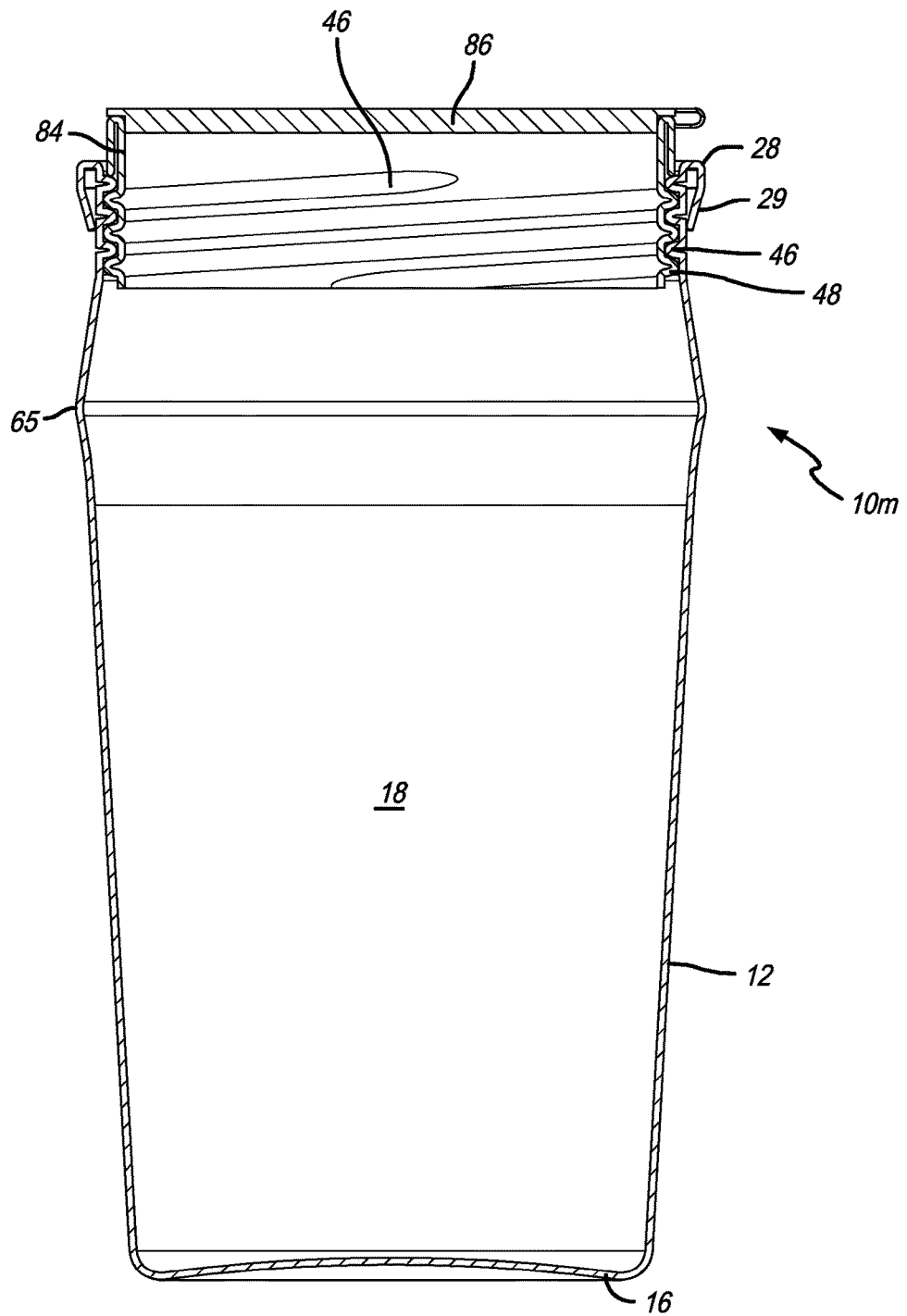
FIG. 39 is a cross-sectional view of the expanding beverage container of FIG. 38.

FIGS. 38-39 show an expandable beverage container 10m. In this embodiment, the beverage container 10m includes a spout 84 with threads 46 that rotate on internal threads 48 on the interior of the main body portion 12. The top of the spout 84 includes a lid 86 that is hingedly connected thereto and covers a drinking opening 87. Alternatively, the spout can include a peel off or twist off top instead of the hinged lid. In a preferred embodiment, the spout 84 seals at the top and bottom of the threaded bottom when compressed and expanded, respectively.

In use, a user expands the volume of the container 10m by unscrewing the spout 84 to the stop point, and then the lid 86 is moved from a closed position to an open position. Ice or other additive can then be added to the beverage within the container 10m.

Figure 40:
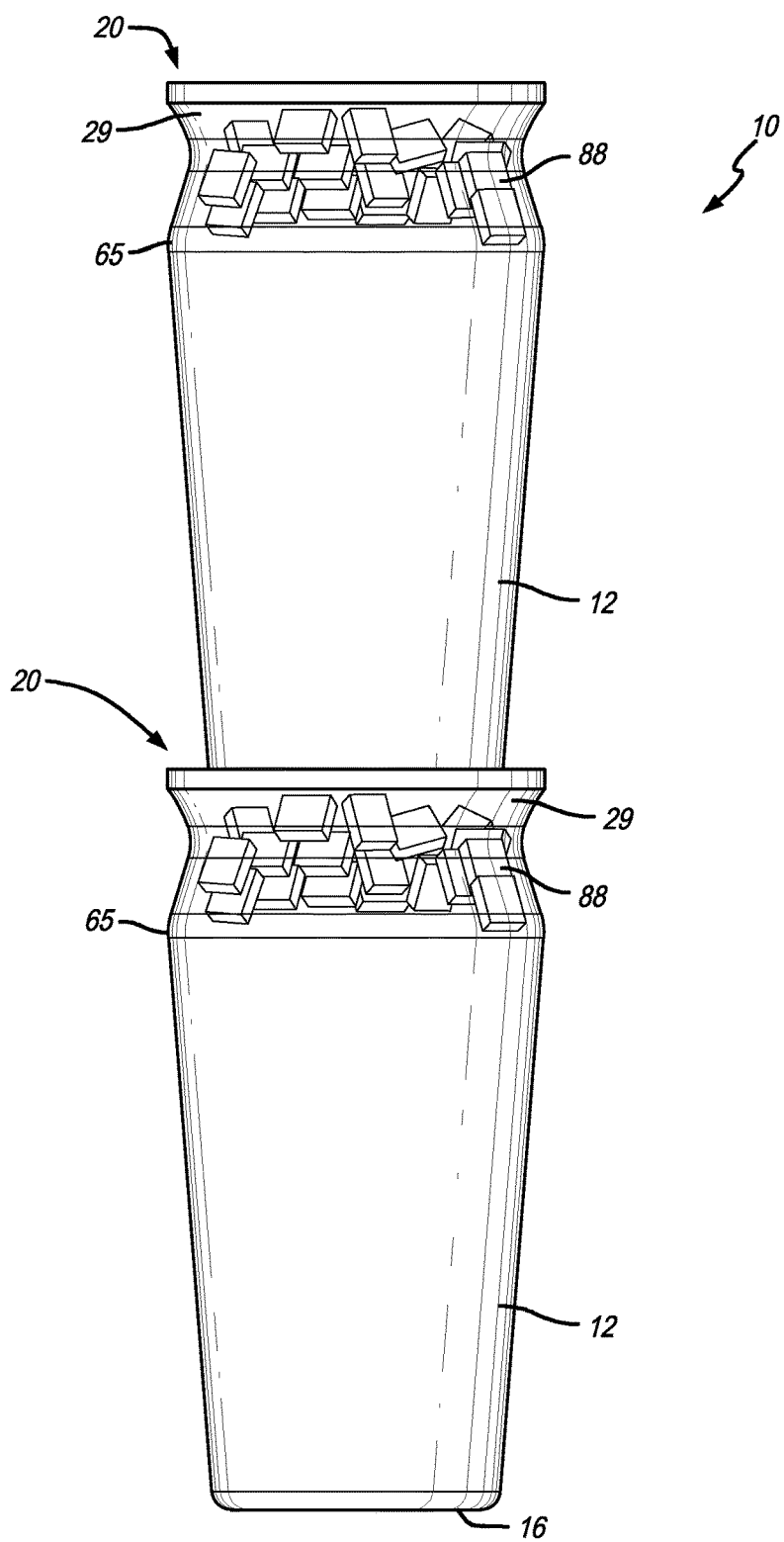
FIG. 40 is a side elevational view of two stacked beverage containers that include ice indicia thereon.

FIG. 40 shows two beverage containers 10 with graphics or indicia 88 on the outside thereof. In a preferred embodiment, the indicia 88 shows ice cubes. This helps remind a consumer that after the recessed top 20 is removed, that there is room for ice to be added to the beverage container 10. FIG. 40 also shows the nesting capability of the beverage containers 10.

Figure 41:
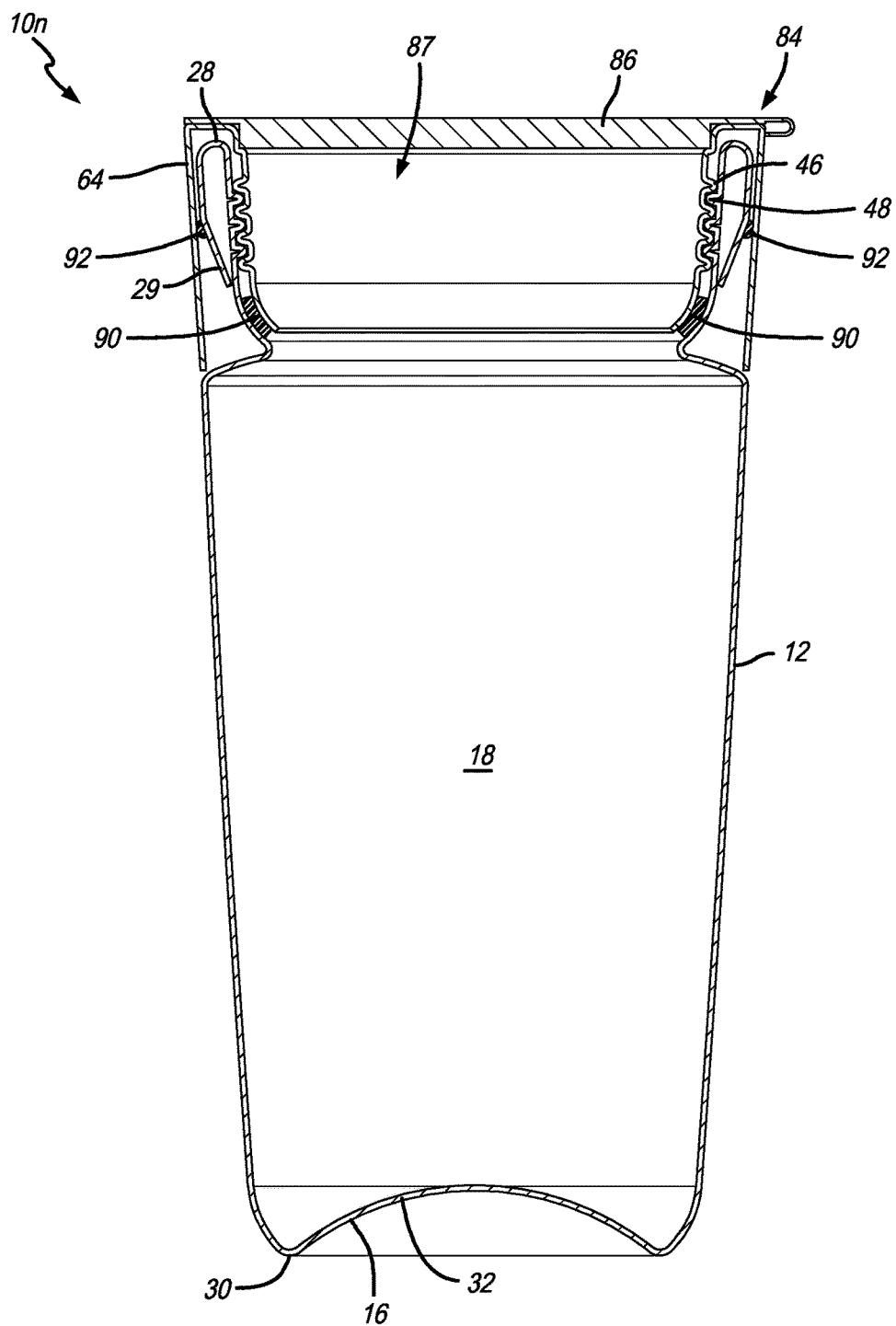
FIG. 41 is a cross-sectional view of a beverage container that includes a cover that can move upwardly to provide room for ice.

FIG. 41 shows another embodiment of an expandable beverage container 10n that includes spout 84 with threads 46 that rotate on internal threads 48 on the interior of the main body portion 12. The top of the spout 84 includes lid 86 that is hingedly connected thereto and covers drinking opening 87. In a preferred embodiment, bottom seal 90 and to seal 92 are included so that the container is sealed at the bottom and top of its rotational and expandable motion.

Figure 42:
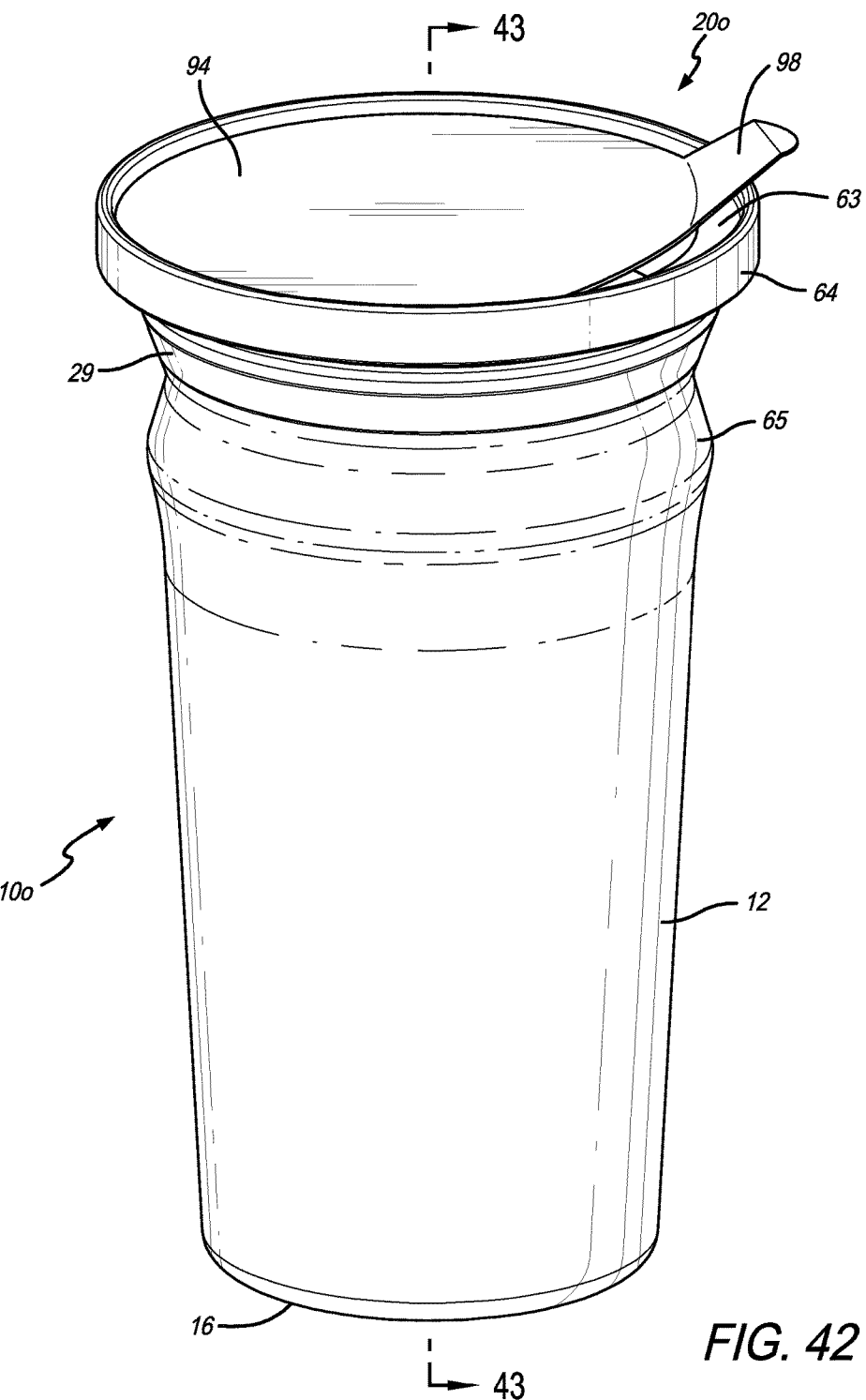
FIG. 42 is a perspective view of a beverage container that includes a cover with space therein for storing food.
Figure 43:
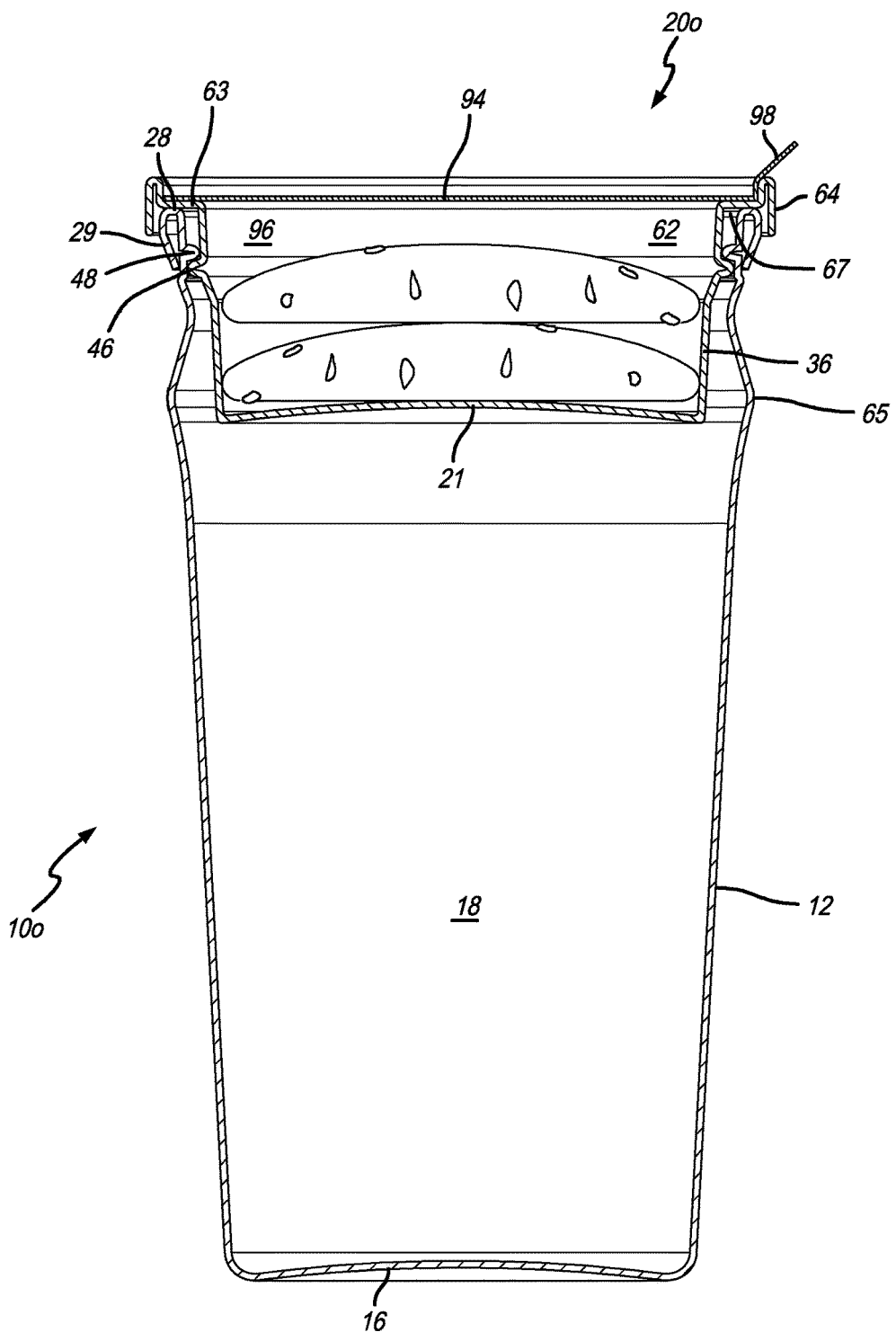
FIG. 43 is a cross-section taken along line 43-43 of FIG. 42.
Figure 44:
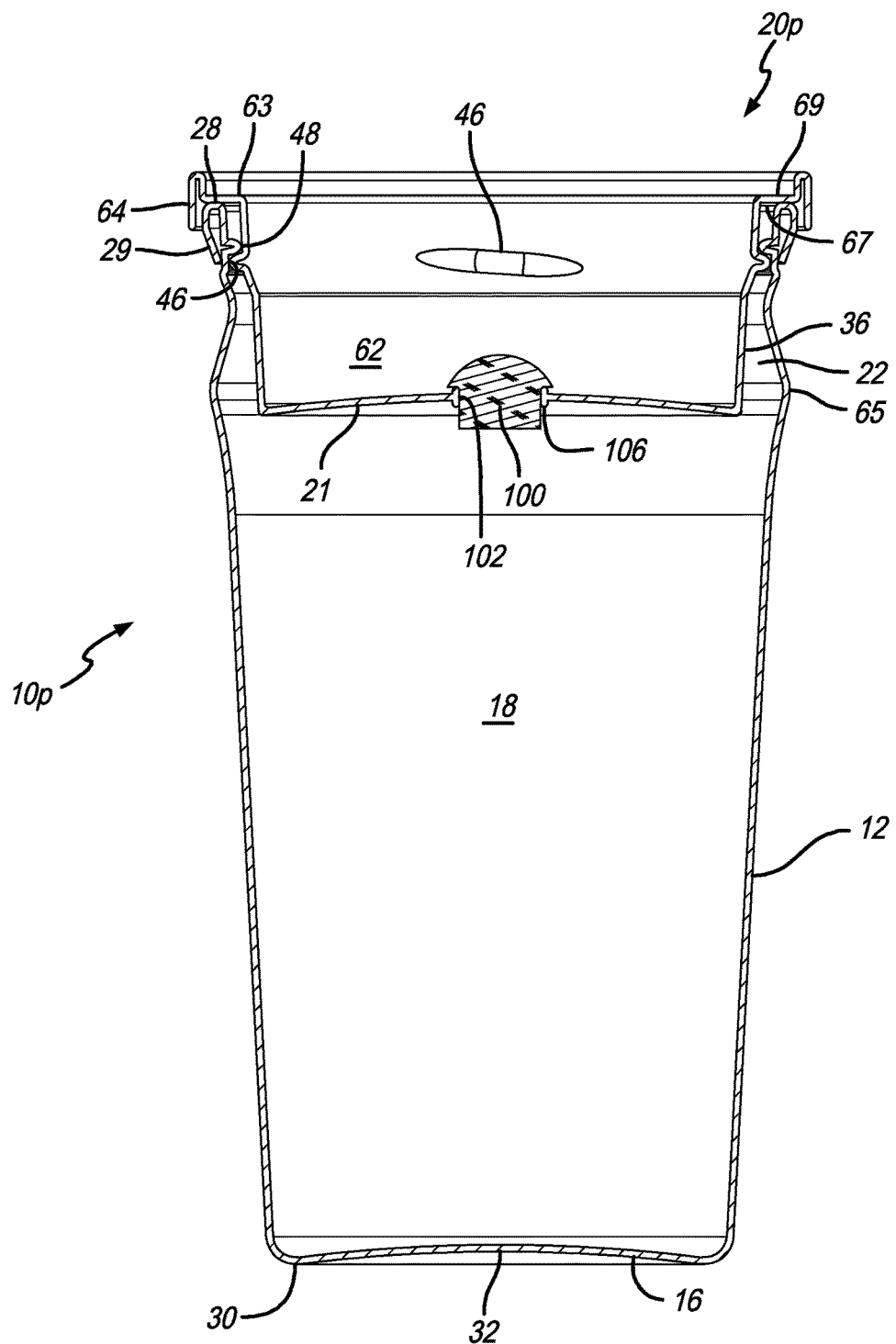
FIG. 44 is a cross-sectional elevational view of a container with a recessed lid that includes a plug therein an accordance with another preferred embodiment of the present invention.

FIG. 42 shows another preferred embodiment of a beverage container 10o that includes a removable lid 94 that covers or seals the cover cavity 62 in the removable cover 20o to define a cover interior 96. The cover interior 96 can be used to store any desired item. For example, as shown in FIGS. 42-43, the cover interior 96 can include food items, such as cookies, biscotti, marshmallows, muffins, cream and sugar packets, etc. In another embodiment, the cover interior 96 can include a liquid, such as a mixer for mixing with the liquid or beverage in the main body portion 12. In another embodiment, the cover interior 96 can include powdered ingredients, such as energy drinks, coffee, tea, etc. Therefore, the container can be sold with water inside and then the powder can be poured in (after removing the lid 94) and then mixed. In another embodiment, the cover interior 96 can include nuts or pretzels, which can be given away or sold together with a can of soda or other beverage on an airplane. Other items such as toys, trinkets, give aways, etc. can also be positioned in the cover interior 96. Any item positioned within the cover interior 96 is within the scope of the present invention. In another embodiment, the container 10 can include chips and salsa. In another embodiment, the removable cover can be used as a cup with the main body portion used as the pitcher or the like.

As shown in FIG. 43, in a preferred embodiment the lid 94 is secured on the annular flange 63. In another embodiment, a separate shoulder can be provided for securing the lid thereto. The lid 94 can include a tab 98 to provide a user with a place to pull off the lid 94. In another embodiment, the lid 94 can be secured to the collar 64.

Many variations on the beverage containers 10 taught herein are within the scope of the invention. For example, the rim 28 can be formed by rolling the material inside or outside. Also, the rims shown in the drawings are generally round. However, they can also be squared or flattened (as shown in FIG. 37F). Furthermore, the shape of the main body portion can be provided according to what type of beverage is being offered therein. For example, the main body portion 12 can be shaped as a cylinder, with a taper, as a cylinder at the top and tapered downwardly therefrom, as a tapered tulip shape, a British/Nonic pint shape, a British tulip pint shape, a stepped taper or a tapered tulip chalice, for example.

With reference to FIGS. 44-48H, another preferred embodiment of a beverage container 10p with a removable and recessed cover 20g. Beverage container 10p is similar to the beverage containers discussed above, but includes a breathable seal, gasket or plug 100 that allows the container 10g to be filled with a substance that requires breathability, such as wine. As shown, the container 10p includes a generally frusto-conical main body portion 12 having an open top 14, a closed bottom 16, an interior 18, and the recessed removable cover 20g. In a preferred embodiment, the bottom 16 includes a circular contact surface 30 that surrounds a non-contact portion 32 extending therebetween. In a preferred embodiment, the non-contact portion 32 has a continuous concave shape.

Figure 45:
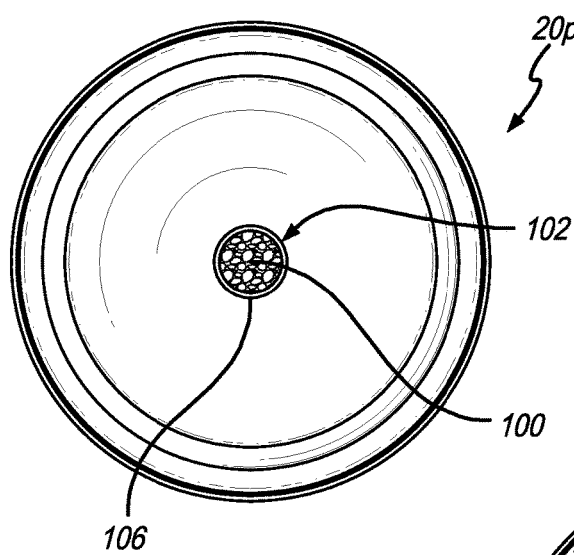
FIG. 45 is a bottom plan view of the recessed lid of FIG. 44.
Figure 46:
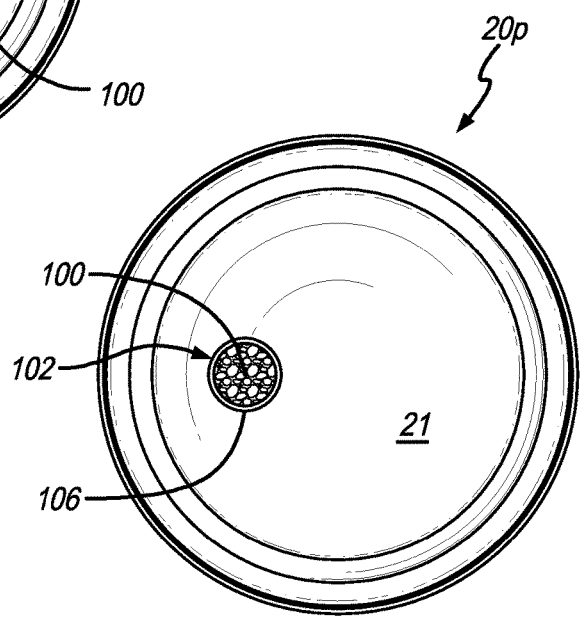
FIG. 46 is a bottom plan view of the recessed lid of FIG. 44 with the plug offset.
Figure 47:
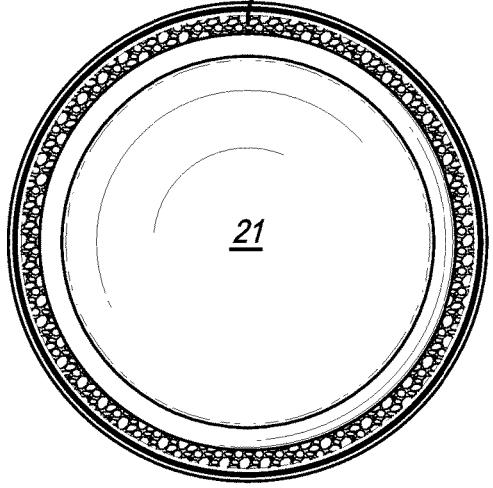
FIG. 47 is a bottom plan view of a recessed lid with an annular ring seal.

The cover 20g includes a bottom 21, a side wall 36 extending upwardly from the bottom 21, an annular flange 63 and a collar 64. The bottom 21 and side wall 36 cooperate to define a cover cavity 62. The cover cavity 62 generally is the volume below the annular flange 63 when the removable cover is in the original position. In a preferred embodiment, the bottom 21 includes a plug opening 102 defined therethrough that receives the plug 100. The plug opening 102 can be positioned in the center of the bottom 21, as shown in FIG. 45 or offset, as shown in FIG. 46. Any of the seals taught herein can be made of a breathable material. As shown in FIG. 47, the seal 104 that seals the cover 20g to the rim 28 can also be made of a breathable material, such as cork.

Figure 48A:
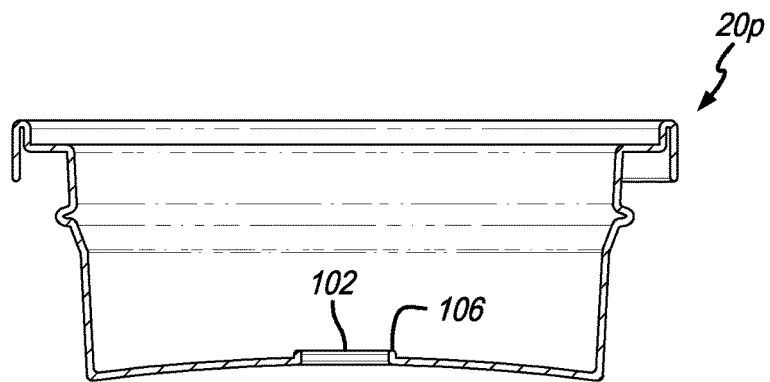
FIG. 48A-48H are a series of cross-sectional elevation views of the recessed lid of FIG. 44 with various plug opening designs.
Figure 48B:
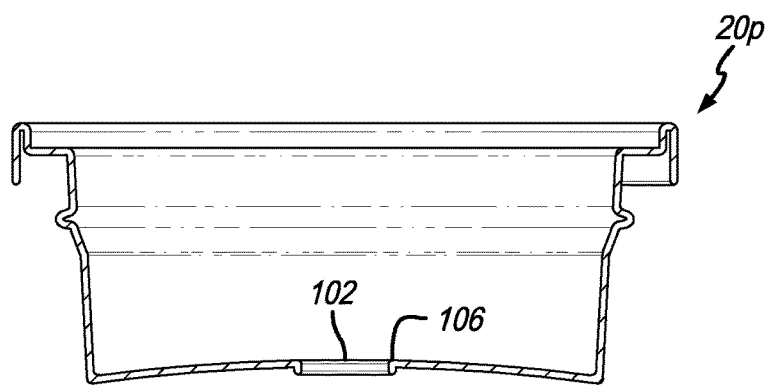
Figure 48C:
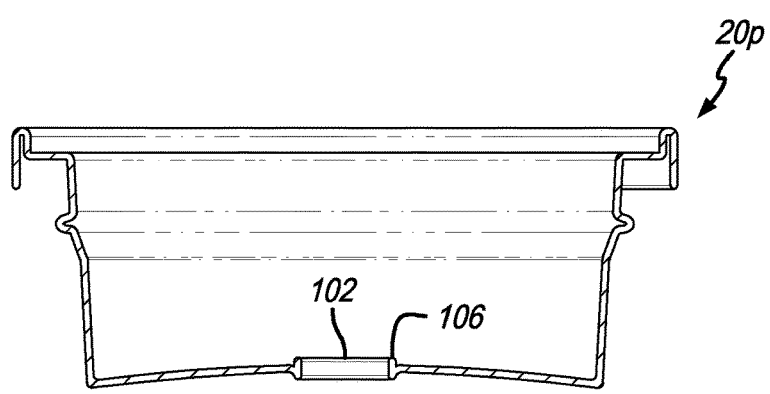
Figure 48D:
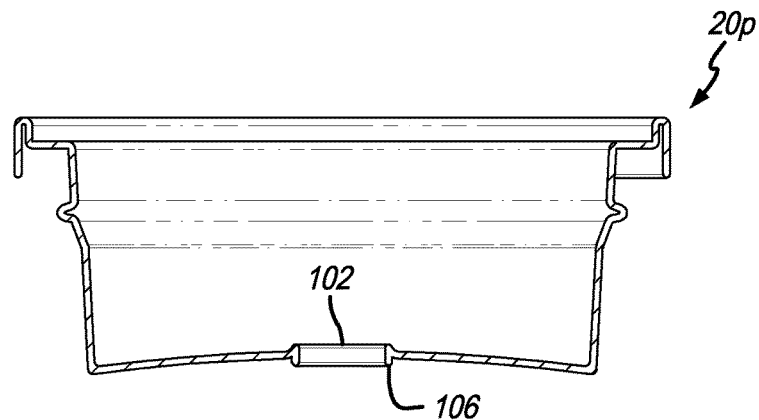
Figure 48E:
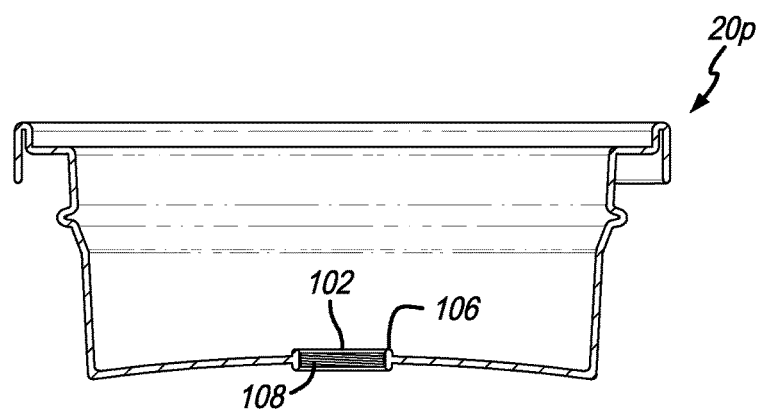
Figure 48F:
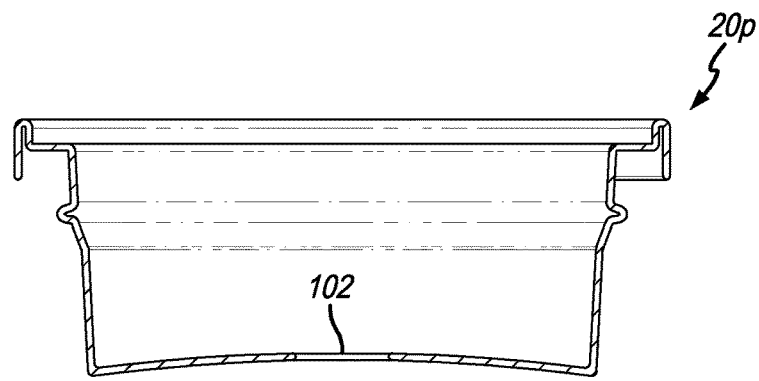
Figure 48G:
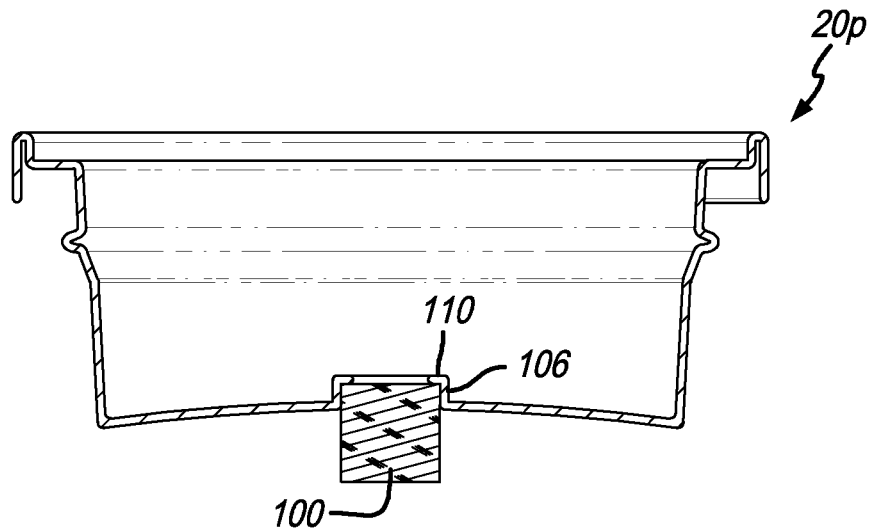
Figure 48H:
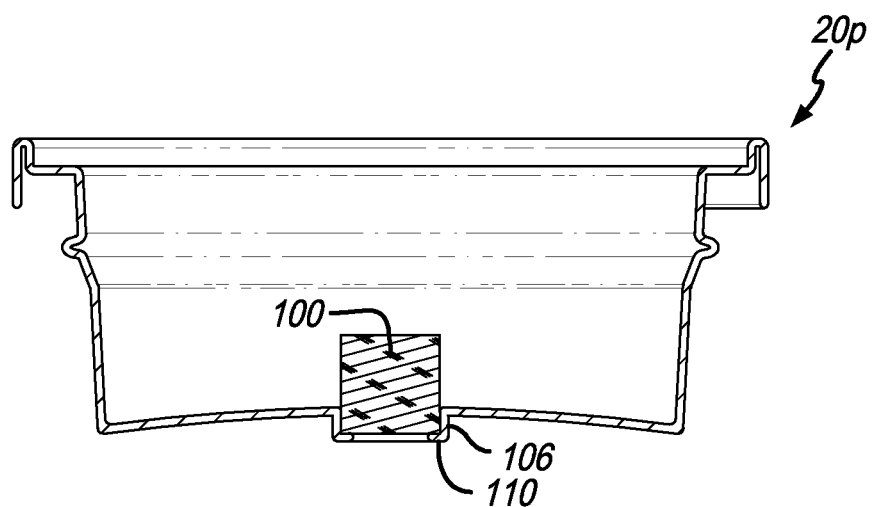

FIGS. 48A-48H show different designs of the plug opening 102 and upwardly and/or downwardly extending flanges or lips 106 that help retain the plug 100 in place. FIG. 48A shows an upwardly extending lip 106. FIG. 4BA shows a downwardly extending lip 106. FIGS. 48C and 48D (and FIG. 44) show upwardly and downwardly extending lips 106. FIG. 48E shows a upwardly and downwardly extending lips 106 that form a threaded cylinder 108 that allows an exteriorly threaded plug to be received therein. FIG. 48A shows an upwardly extending lip 106. FIG. 48F shows a plug opening 102 with no lips. FIG. 48G shows an upwardly extending lip 106 with an inwardly extending flange 110 for retaining the plug 100 therein. FIG. 48H shows a downwardly extending lip 106 with an inwardly extending flange 110 for retaining the plug 100 therein. It will be appreciated that the plug can be any size including up to the size of lid and that the plug and plug opening can be used with any of the containers taught herein and not just that shown in FIG. 44.

Figure 49:
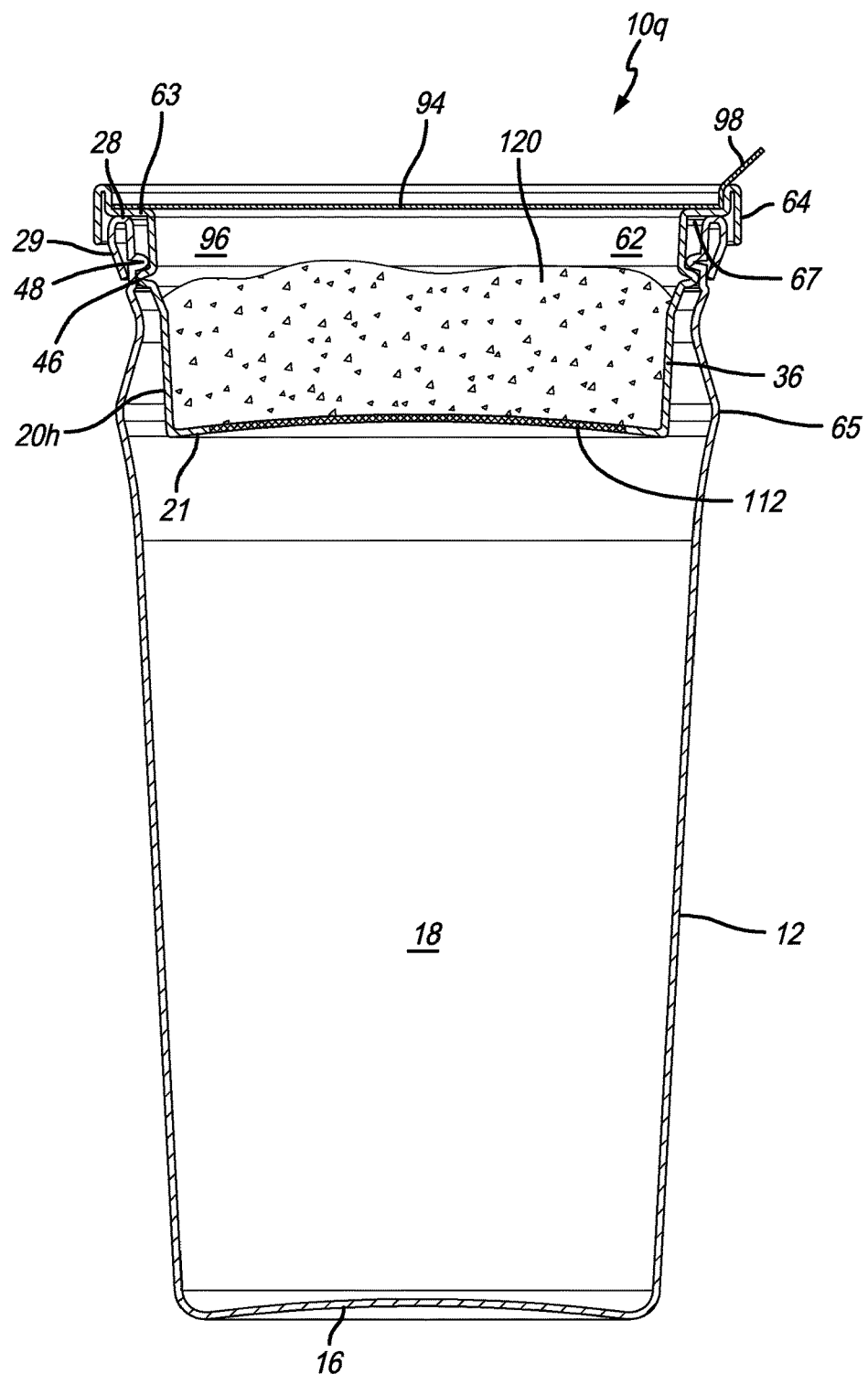
FIG. 49 is a cross-sectional elevational view of a container with a recessed lid that includes coffee grinds therein an accordance with another preferred embodiment of the present invention.

FIG. 49 shows another preferred embodiment of a beverage container 10q with a removable and recessed cover 20h. Container 10q is similar to container 10o discussed above. In a preferred embodiment, the recessed cover 20h includes a filter portion 112. The filter portion 112 is preferably part of the bottom 21. However, the filter portion 112 can also be part of the side wall 36. Preferably, the recessed cover 20h includes a removable lid 94 that covers or seals the cover cavity 62 to define the cover interior 96. The cover interior 96 can be used to store a dry substance 120 that water or other liquid is filtered through, such as coffee, tea, energy drinks, kool aid, etc. This allows a liquid, such as water to be mixed with or filtered through the dry substance, then through the filter portion 112 and into the interior of the main body portion 12. The filter portion 112 includes openings or pores therein that are smaller in size than the particulates of the dry substance.

In an exemplary use using coffee grinds as the dry substance 120, a user heats up some water, removes the lid 94 from the recessed cover 20h, and pours the hot water into the cover interior 96 where it filters through the coffee and the filter portion 112 and into the main body portion. Then the recessed cover 20h is removed so the user can drink the coffee.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes are presented in a given order, alternative embodiments may perform routines having steps in a different order, and some steps may be deleted, moved, added, subdivided, combined, and/or modified to provide alternative or subcombinations. Each of these processes may be implemented in a variety of different ways. Also, while processes are at times shown as being performed in series, these processes may instead be performed in parallel, or may be performed, at different times. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A beverage container comprising:
a main body portion having an open top and a closed bottom and defining an interior, wherein the main body portion defines a first volume, and
a removable cover that includes a bottom and a generally cylindrical side wall extending upwardly from the bottom, wherein the bottom and the generally cylindrical side wall cooperate to define a cover cavity, wherein the removable cover is removably engaged with the main body portion, and wherein the bottom includes a plug opening defined therethrough, wherein a breathable plug is received in the plug opening, whereby the plug allows a liquid disposed within the first volume to breathe, wherein a recess is defined between the bottom of the removable cover and the open top of the main body portion, and wherein the recess defines a second volume that is between about 5% and about 50% of the first volume.

2. The beverage container of claim 1 wherein the bottom includes a lip that at least partially defines the plug opening.

3. The beverage container of claim 2 wherein the lip extends at least one of upwardly or downwardly from the bottom.

4. A beverage container comprising:
a main body portion having an open top and a closed bottom and defining an interior, wherein the main body portion defines a first volume, wherein the main body portion includes a circular rim and a first set of threads on an inside surface thereof that are positioned adjacent the rim at a first height, wherein the rim includes a downwardly depending portion that extends below the first set of threads, and wherein the main body portion defines a first volume, and
a removable cover that includes a bottom and a generally cylindrical side wall extending upwardly from the bottom, wherein the bottom and the generally cylindrical side wall cooperate to define a cover cavity, wherein the removable cover is removably engaged with the main body portion, and wherein the bottom includes a plug opening defined therethrough, and wherein a breathable plug is received in the plug opening, whereby the plug allows a liquid disposed within the first volume to breathe, wherein the cover includes an annular flange extending outwardly from the generally cylindrical side wall and an annular collar, wherein the collar, the annular flange and the generally cylindrical side wall define a first channel that receives the rim, and wherein the generally cylindrical side wall includes a second set of threads on an outside surface thereof that are matingly engaged with the first set of threads on the main body portion.

5. The beverage container of claim 4 wherein the collar and the annular flange define a second channel opposed to the first channel, and wherein the removable cover can be inverted from an original position where the rim is received in the first channel to an inverted position such that the rim is received in the second channel.

6. The beverage container of claim 5 wherein the collar is dimensioned such that when the removable cover is in the inverted position the collar provides a friction fit on top of the main body portion.

7. The beverage container of claim 5 wherein the generally cylindrical side wall includes a third set of threads that are matingly engaged with the first set of threads when the removable cover is in the inverted position.

8. The beverage container of claim 4 wherein the removable cover can be moved from an original position where the rim is received in the first channel to a bottom position where the bottom of the main body portion is received in the cover cavity, and wherein the generally cylindrical side wall is dimensioned to provide a friction fit with the main body portion in the bottom position.

9. The beverage container of claim 7 wherein the removable cover can be moved from an original position where the rim is received in the first channel to a bottom position where the bottom of the main body portion is received in the cover cavity, and wherein the generally cylindrical side wall is dimensioned to provide a friction fit with the main body portion in the bottom position.

10. The beverage container of claim 4 wherein the first set of threads are positioned at a first height, wherein the downwardly depending portion of the rim includes a bottom edge that is positioned at a second height, and wherein the first height is greater than the second height.

11. The beverage container of claim 5 wherein the removable cover is sealed with respect to the main body portion in both the original position and the inverted position.

12. A beverage container comprising:
- a main body portion having an open top and a closed bottom and defining an interior, wherein the main body portion defines a first volume, and
- a removable cover that includes a bottom and a generally cylindrical side wall extending upwardly from the bottom, wherein the bottom and the generally cylindrical side wall cooperate to define a cover cavity, wherein the removable cover is removably engaged with the main body portion, wherein the bottom includes a filter portion therein, wherein the removable cover further includes a removable lid that covers the cover cavity and partially defines a cover interior, and wherein a dry substance is disposed in the cover interior, wherein a recess is defined between the bottom of the removable cover and the open top of the main body portion, and wherein the recess defines a second volume that is between about 5% and about 50% of the first volume.

* * * * *